US007064166B2

(12) United States Patent
Matyjaszewski et al.

(10) Patent No.: US 7,064,166 B2
(45) Date of Patent: Jun. 20, 2006

(54) PROCESS FOR MONOMER SEQUENCE CONTROL IN POLYMERIZATIONS

(75) Inventors: Krzysztof Matyjaszewski, Pittsburgh, PA (US); Betül Kirci, Batikent Ankara (TR); Jean François Lutz, Pittsburgh, PA (US); Tomislav Pintauer, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 36 days.

(21) Appl. No.: 10/269,556

(22) Filed: Oct. 11, 2002

(65) Prior Publication Data

US 2003/0139553 A1  Jul. 24, 2003

Related U.S. Application Data

(60) Provisional application No. 60/329,210, filed on Oct. 12, 2001.

(51) Int. Cl.
*C08F 8/00* (2006.01)
(52) U.S. Cl. ............. 525/168; 525/243; 525/245; 526/135; 526/146; 526/147; 526/240; 526/310; 526/328
(58) Field of Classification Search ............ 526/90, 526/91, 240, 310, 328, 135, 146, 147; 525/168, 525/243, 245
See application file for complete search history.

(56) References Cited

U.S. PATENT DOCUMENTS

| | | | |
|---|---|---|---|
| 3,183,217 A | 5/1965 | Serniuk et al. | |
| 3,959,225 A | 5/1976 | Kuntz | |
| 4,007,165 A | 2/1977 | MacLeay et al. | |
| 4,374,751 A | 2/1983 | Dudgeon | |
| 4,728,706 A | 3/1988 | Farnham et al. | |
| 4,806,605 A * | 2/1989 | Hertler .............. | 526/190 |
| 4,940,648 A | 7/1990 | Geiger | |
| 4,954,416 A | 9/1990 | Wright et al. | |
| 5,089,135 A | 2/1992 | Yoneyama et al. | |
| 5,169,914 A | 12/1992 | Kaszas et al. | |
| 5,248,746 A * | 9/1993 | Shimokawa et al. ...... | 526/145 |
| 5,312,871 A | 5/1994 | Mardare et al. | |
| 5,405,913 A | 4/1995 | Harwood et al. | |
| 5,451,647 A | 9/1995 | Faust et al. | |
| 5,470,928 A | 11/1995 | Harwood et al. | |
| 5,510,307 A | 4/1996 | Narayanan et al. | |
| 5,763,548 A | 6/1998 | Matyjaszewski et al. | |
| 5,789,487 A | 8/1998 | Matyjaszewski et al. | |
| 5,807,937 A | 9/1998 | Matyjaszewski et al. | |
| 5,811,500 A * | 9/1998 | Dubois et al. ............. | 526/145 |
| 5,910,549 A | 6/1999 | Matyjaszewski et al. | |
| 5,945,491 A | 8/1999 | Matyjaszewski et al. | |
| 6,111,022 A | 8/2000 | Matyjaszewski et al. | |
| 6,121,371 A | 9/2000 | Matyjaszewski et al. | |
| 6,124,411 A | 9/2000 | Matyjaszewski et al. | |
| 6,162,882 A | 12/2000 | Matyjaszewski et al. | |
| 6,288,186 B1 | 9/2001 | Matyjaszewski et al. | |
| 6,407,187 B1 | 6/2002 | Matyjaszewski et al. | |
| 6,512,060 B1 | 1/2003 | Matyjaszewski et al. | |
| 6,538,091 B1 | 3/2003 | Matyjaszewski et al. | |
| 6,541,580 B1 | 4/2003 | Matyjaszewski et al. | |
| 6,624,262 B1 | 9/2003 | Matyjaszewski et al. | |
| 6,624,263 B1 | 9/2003 | Matyjaszewski et al. | |
| 6,627,314 B1 | 9/2003 | Pyun et al. | |

FOREIGN PATENT DOCUMENTS

| | | | |
|---|---|---|---|
| EP | 0341012 | | 11/1989 |
| EP | 0870809 | | 10/1998 |
| WO | WO 98/01480 | | 1/1998 |
| WO | WO 00/47634 | * | 8/2000 |
| WO | WO 00/56795 | | 9/2000 |

OTHER PUBLICATIONS

U.S. Appl. No. 09/359,359, filed Jul. 23, 1999.
U.S. Appl. No. 09/972,056, filed Oct. 5, 2001.
U.S. Appl. No. 10/034,908, filed Dec. 21, 2001.
U.S. Appl. No. 10/118,519, filed Apr. 6, 2002.
U.S Appl. No. 10/271,025, filed Oct. 15, 2002.
U.S. Appl. No. 10/289,545, filed Nov. 7, 2002.
Carter et al., "Polyimide Nanofoams From Phase-Separated Block Copolymers", Electrochemical Society Proceedings, 1997, pp. 32-43, vol. 97, No. 8, Electrochemical Society, Pennington, NJ, US,.
Chen et al., "Pryolytic Behavior and In-Situ Paramagnetism of Star-like $C60(CH3)x(PAN)x$copolymers", European Polymer Journal, Mar. 1, 1998, pp. 421-429, vol. 34, No. 3-4, Elsevier Science Ltd., Oxford, GB.
Dorota Greszta et al., "Gradient Copolymers of Styrene and Acrylonitrille Via Atom Transfer Radical Polymerization", Polymer Preprints, Apr. 1997, pp. 709-710, vol. 38(1).
Gromada, J.; Matyjaszewski, K. Macromolecules 2001, 34, 7664-7671.
Jin-Shan Wang and Krzysztof MatyJaszewski, "Controlled/ "Living" Radical Polymerization. Atom Transfer Radical Polymerization in the Presence of Transition-Metal Complexes". Reprinted form the Journal of the American Chemical Society, 1995, vol. 117, No. 20.

(Continued)

*Primary Examiner*—Bernard Lipman
(74) *Attorney, Agent, or Firm*—Kirkpatrick & Lockhart Nicholson Graham LLP

(57) ABSTRACT

The present invention relates to a polymerization process for the control of the microstructure of polymers and to novel copolymers. An embodiment of the present invention relates a process of polymerizing first and second monomers in the presence of a complex comprising at least one of the monomers. The presence of the complex modifies the relative reactivity, or cross propagation rate constants, of the monomers in copolymerization reactions. Embodiments of the present invention allow the synthesis of polymers with novel stereochemistry and monomer sequence distribution, for example, but not limited to, copolymers with at least one segment of alternating monomers, a controlled molecular weight and narrow molecular weight distribution, or a segment of high concentration of the first monomer.

19 Claims, 14 Drawing Sheets

OTHER PUBLICATIONS

Jin-Shan Wang and Krzysztof MatyJaszewski, "Controlled/"Living" Radical Polymerization. Halogen Atom Tranfer Radical Polymerization Promoted by a Cu(I)/Cu(II) Redox Process". Reprinted from Macromolecules, 1995, 28. Department of Chemistry, Carnegie Mellon University. Received May 2, 1995; Revised Manuscript Received Aug. 14, 1995.

Krzysztof MatyJaszewski, Mingli Wei, Jianhui Xia and Nancy E. McDermott, "Controlled/"Living" Radical Polymerization of Styrene and Methly Methacrylate Catalyed by Iron Complexes 1", Macromolecules, vol. 30, No. 26, 1997.

Krzysztof MatyJaszewski, Simion Coca, Scott G. Gaynor, Mingli Wei and Brian E. Woodworth, "Zerovalent Metals in Controlled/"Living" Radical Polymerization", Macromolecules, 1997, pp. 7348-7350, vol. 30, No. 23.

MatyJaszewski, K.; Editor Controlled/Living Radical Polymerization. Progress in ATRP, NMP, and RAFT. In: ACS Symp. Ser., 2000; 768, 2000., Chapter 19 "Reverse Atom Transfer Radical Polymerization Using AIBN or BPO as Initiator" pp. 263-275.

MatyJaszewski, K.; Xia, J. Chem. Rev. 2001, 101, 2921-2990.

Mingli Wei, Jianhui Xia, Nancy E. McDermott and Krzysztof MatyJaszewski, "Atom Tranfer Radical Polymerization of Styrene in the Presence of Iron Complexes", Polymer Preprints, 38(2), 231 (1997), Department of Chemistry, Carnegie Mellon University.

Qiu, J.: MatyJaszewski, K.; Thouin, L.; Amatore, C. Macromol. Chem. Phys. 2000. 201, 1625-1631.

Queffelec, J.; Gaynor, S.G.; Maty Jaszewski, K. Macromolecules 2000, 33, 8629-8639.

Simon Coca, Christina B. Jasieczek, Kathryn L. Beers and Krzysztof MatyJaszewski, "Polymerization of Acrylates by Atom Transfer Radical Polymerization. Homopolymerization of 2-Hydroxyethyl Acrylate", Journal of Polymer Science, 1998. pp. 1417-1424, vol. 36, Part A: Polymer Chemistry.

Seong Mu Jo et al, "Polyacrylonitrile with Low Polydispersities by Atom Transfer Radical Polymerization", Polymer Preprints, vol. 38(1) Apr. 1997, pp. 697-698.

Seong Mu Jo et al, "Effects of Various Copper Salts and Additives on Polymerization of Acrylonitrile by Atom Transfer Radical Polymerization", Polymer Preprints, vol. 38(1) Apr. 1997, pp. 699-700.

Takeichi et al., "Preparation of Porous Carbon Films by the Pyrolysis of Poly(Urethane-imide) Films and Their Pore Characteristics", Carbon, Feb. 2001, pp. 257-265, vol. 39, No. 2.

Timothy E. Patten and Krzysztof MatyJaszewski, Atom Transfer Radical Polymerization and the Synthesis of Polymeric Materials, Advanced Materials 1998 10 No. 12, 901-915.

T.E. Patten et al., "Polymers with very Low Polydispersities from Atom Tranfer Radical Polymerization", Science, vol. 272, pp. 866-868, May 10, 1996.

U. Schubert et al., "Design of Effective Systems for Controlled Radical Polymerization of Styrene: Application of 4,4'-Dimethyl and 5,5'-Dimethyl 2,2'-Bipyridine Copper(ii) Complexes", Macromol, Rapid Commun., vol. 20, No. 6, pp. 351-355, 1999.

Wang et al., "Living"/Controlled Radical Polymerization, Transition-Metal-Catalyzed Atom Transfer Radical Polymerization in the Presence of a Conventional Radical Initiator, Macromolecules, 1995, vol. 28, pp. 7572-7573.

Wang, J.-S.; MatyJaszewski, K., J. Am. Chem. Soc. 1995, 117, 5614-5615.

Xia J. and MatyJaszewski K., "Controlled/"Living" Radical Polymerization. Homogenous Reverse Atom Transfer Radical Polymerization Using AIBN as the Initiator," Macromolecules, 1997, pp. 7692-7696, vol. 30.

* cited by examiner $^1$H NMR (300 MHz, (CD$_3$)$_2$CO) of [Cu$^I$(PMDETA)(CH$_2$CH(COOCH$_3$))]$^+$[BPh$_4$]

Crystal structure of [Cu$^I$(PMDETA)(π-CH$_2$CH(COOCH$_3$))][BPh$_4$] viewed along the c-axis ORTEP drawing of [Cu¹(PMDETA)(π-CH₂CH₂CH(COOCH₃))]⁺ cation. Hydrogen atoms have been removed for clarity.

Crystal structure of [Cu(PMDETA)(π-CH$_2$CH(C$_6$H$_5$))][BPh$_4$] viewed along the c-axis.

ORTEP drawing of [Cu¹(PMDETA)(π-CH₂CH(C₆H₅))]⁺ cation. Hydrogen atoms have been removed for clarity.

PROCESS FOR MONOMER SEQUENCE CONTROL IN POLYMERIZATIONS

CROSS REFERENCE TO RELATED APPLICATIONS

This application is a nonprovisional application claiming priority from U.S. application Ser. No. 60/329,210 filed on Oct. 12, 2001.

TECHNICAL FIELD OF THE INVENTION

The present invention relates to a polymerization process for the control of the microstructure of polymers and to novel copolymers. An embodiment of the present invention relates a process of polymerizing first and second monomers in the presence of a complex comprising at least one of the monomers. The presence of the complex modifies the relative reactivity, or cross propagation rate constants, of the monomers in copolymerization reactions. Embodiments of the present invention allow the synthesis of polymers with novel stereochemistry and monomer sequence distribution, for example, but not limited to, copolymers with at least one segment of alternating monomers, a controlled molecular weight and narrow molecular weight distribution, or a segment of high concentration of the first monomer.

DETAILED DESCRIPTION OF EMBODIMENTS OF THE INVENTION

Embodiments of the present invention are directed toward a polymerization process comprising polymerizing first and second monomers under controlled polymerization conditions in the presence of a complex comprising the at least one of the monomers. Preferably, the polymerization is a performed under controlled radical polymerization conditions. A further embodiment comprises a polymerization process comprising polymerizing first monomers and second monomers wherein the polymerizing is in the presence of a complex comprising at least one of the monomers and a transition metal.

A living polymerization process is a chain growth process without, or with an insignificant amount, of chain breaking reactions, such as transfer and termination reactions. Controlled/living polymerization, herein "controlled polymerization", is a chain growth process that under controlled polymerization conditions provides effective control over the chain growth process to enable synthesis of polymers with molecular weight control and narrow polydispersities or molecular weight distributions. Molecular weight control is provided by a process having a substantially linear growth in molecular weight of the polymer with monomer conversion accompanied by essentially linear semilogarithmic kinetic plots, in spite of any occurring terminations. Polymers from controlled polymerization processes typically have molecular weight distributions, characterized by the polydispersity index ("PDI"), of less than or equal to 2. The PDI is defined by the ratio of the weight average molecular weight to the number average molecular weight, $M_w/M_n$. More preferably in certain applications, polymers produced by controlled polymerization processes have a PDI of less than 1.5, and in certain embodiments, a PDI of less than 1.3 may be achieved.

Polymerization processes performed under controlled polymerizations conditions achieve these properties by consuming the initiator early in the polymerization process and, in at least one embodiment of controlled polymerization, an exchange between an active growing chain and dormant polymer chain is fast in comparison to the propagation of the polymer. A controlled radical polymerization ("CRP") process is a process performed under controlled polymerization conditions with a chain growth process by a radical mechanism, such as, but not limited to, atom transfer radical polymerization, stable free radical polymerization, such as, nitroxide mediated polymerization, reversible addition-fragmentation transfer/degenerative transfer/catalytic chain transfer radical systems. A feature of controlled radical polymerizations is the existence of an equilibrium between active and dormant species. The exchange between the active and dormant species provides a slow chain growth relative to conventional radical polymerization, but all polymer chains grow at the same rate. Typically, the concentration of radicals is maintained at levels low enough to minimize termination reactions. This exchange, under appropriate conditions, also allows the quantitative initiation necessary for synthesizing polymers with special architecture and functionality. CRP processes may not eliminate the chain breaking reactions, however, the chain breaking reactions are significantly reduced from conventional polymerization processes.

Polymers produced under controlled polymerization conditions have a degree of polymerization that may be determined from the ratio of the amount of consumed monomer to the initiator, a polydispersity close to a Poisson distribution and functional or, optionally, functionalized chain ends. The level of control attained in a particular polymerization process is typically monitored by analyzing the kinetics of the polymerizations, the evolution of molecular weights, polydispersities and functionalities with conversion.

There are several CRP processes that allow the (co)polymerization of radically polymerizable monomers to synthesize polymers with complex macromolecular architectures. Of the CRP processes presently developed, three processes have gained significant attention and may provide efficient (co)polymerization of a wide range of monomers. These three processes are atom transfer radical polymerization ("ATRP"), stable free radical polymerization ("SFRP") including nitroxide mediated polymerization (NMP), and reversible addition-fragmentation chain transfer ("RAFT"). All three CRP processes are performed under conditions that maintain an equilibrium between a dormant species and an active species. The dormant species is activated with the rate constant of activation and form active propagating radicals. Monomer may react with the initiator or polymer chain as the active propagating radical. The propagating radicals are deactivated with the rate constant of deactivation (or the rate constant of combination) or may terminate with other growing radicals with the rate constant of termination. This equilibrium controls the overall polymerization rate. Typically, the concentration of the growing radicals is kept very low in CRP processes in order to significantly reduce the termination reactions.

Controlled polymerizations provide a substantially linear semi-logarithmic plot of $\ln([M]_0/[M])$ versus time. In the typical case where the polymerization reaction is first order with regard to monomer concentration, linear evolution of molecular weight distribution with conversion and PDI may decrease with polymerization time. The end functionality remains on substantially all polymers. Since the CRP processes are radical processes the rate of consumption of each comonomer and the resulting bulk properties of the polymer species, typically are similar to polymers prepared by conventional, uncontrolled radical polymerization.

SFRP processes are conducted under polymerization conditions comprising a radical source, a stable free radical and at an appropriate temperature to provide the effective exchange between the active and dormant species. The stable force radical acts as the control agent. The radical source and the stable free radical may be combined in one species. NMP processes are typical of SFRP processes. NMP processes include the initiation of the polymerization in the presence of a nitroxide, such as, for example, 2,2,6,6-tetramethyl-1-piperidinyloxyl ("TEMPO") or TEMPO derivatives, di-tert-butylnitroxide or derivatives thereof, or phosphorus containing nitroxides, such as, SG-1 developed by AtoFina for acrylate polymerization, or bulky organic radicals or may employ a preformed alkoxyamine as the radical source/control agent.

ATRP is one of the most successful controlled/"living" radical processes (CRP) developed and has been thoroughly described in a series of co-assigned U.S. patents and applications, U.S. Pat. Nos. 5,763,546; 5,807,937; 5,789,487; 5,945,491; 6,111,022; 6,121,371; 6,124,411; 6,162,882; 6,407,187; and U.S. patent application Ser. Nos. 09/018,554; 09/359,359; 09/359,591; 09/369,157; 09/534,827; 09/972,046; 09/972,056; 09/972,260; 10/034,908; and 10/098,052 all of which are herein incorporated by reference, and has been discussed in numerous publications by Matyjaszewski as co-author and reviewed in several publications. ATRP processes are conducted under controlled polymerization conditions comprising a catalyst and an initiator comprising a radically transferable atom or group capable of participating in a reversible redox cycle between the catalyst and the initiator and a polymer chain. ATRP processes involve a catalyzed, essentially homolytic, reversible cleavage of a covalent bond in a dormant species by a reversible redox reaction with a transition metal complex to form the active propagating species. In an ATRP process, deactivation is controlled by the reverse atom transfer between growing radicals and the redox conjugate of the catalyst reforming a dormant species.

Degenerative transfer or RAFT is conducted under controlled polymerization conditions including the presence of chain transfer agent, typically a dithio compound, which acts as efficient reversible addition-fragmentation chain transfer agent. RAFT polymerization conditions allow the polymerization of a wide range of monomers including functional monomers, such as, but not limited to, styrenes, acrylates, methacrylates, acrylic cid, DMAEMA, and HEMA. The monomers may be arranged in a wide range of various architectures, including block, star, and gradient polymers. A RAFT transfer agent may, typically, be of the formula 1, 2, 3, shown below.

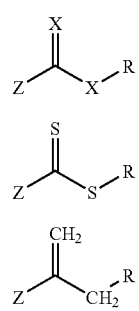

Formula 1
Formula 2
Formula 3 where R is a radical leaving group, such as, $C(CH_3)_2CN$, $C(CH_3)_2Ph$, $C(CH_3)(CN)CH_2CH_2CH_2OH$, $CH_2Ph$, and Z modifies the activity of the RAFT transfer agent, such as, but not limited to, phenyl, methyl, dialkylamino. In the case of thiocarbonylthio transfer agents, the transfer agent must have a high chain transfer constant, for example, greater than 2. The rapid switching between the dormant species and active propagating species produce control in the process. The mechanism of a RAFT polymerization process is shown in FIG. 1. In RAFT polymerization, the molecular weight is predetermined by the ratio of consumed monomer to the consumed initiator plus the moles of added transfer agent.

CRP processes provide techniques to produce a wide range of polymeric materials including homopolymer and copolymers with specific structures including, but not limited to, block, random, statistical, periodic, gradient, star, graft, comb, (hyper)branched or dendritic polymeric materials. The addition of the comonomers to growing copolymer chains in CRP processes is controlled by different physical and statistical laws, depending upon the specific reactants, the method, and conditions of synthesis. Generally, monomer addition to the active propagating species is at least partially controlled by the relative concentrations of the available comonomers in the polymerization medium, the specific monomer unit at the end of the growing polymer species, and the relative reaction rates of each comonomer with the active propagating species. In the CRP without complexed monomers, the reactivity ratios of the comonomers are similar to the reactivity ratios observed in conventional radical copolymerization.

Embodiments of the present invention comprise copolymerization processes that adjust the relative reactivity of one or more of the comonomers. Embodiments of the present invention include polymerization processes comprising polymerizing first and second monomers under controlled polymerization conditions in the presence of a complex comprising the at least one of the monomers. Preferably, the polymerization is a performed under controlled radical polymerization conditions. The monomer may be complexed by adding a complexing agent to the polymerization system or by adjusting the concentration of components of a controlled radical polymerization process to allow two components to form a complex. The monomer may form the complex with substituent on the monomer, such as, a carbonyl bond or can form a complex with an unsaturated double bond in the monomer. The complex agent is not limited to forming a complex with one or more of the monomers but may also participate in the polymerization reaction in other ways, such as, the dual role of the transition metal complexes of an ATRP process as a catalyst and complexing agent with a monomer. Embodiments may be extended to complexed monomers, including transition metal complexed monomers, in other polymerization processes, including uncontrolled free radical polymerizations.

A perfect alternating copolymer is a copolymer comprising two species of monomeric units in an alternating sequence. An ideal alternating copolymerization is a process in which two monomers add to the copolymer in equimolar amounts in a nonrandom, alternating arrangement along the copolymer chain. In the production of an alternating copolymer, it is preferable that the two propagating monomers, when they reside at the chain end, preferentially adds to the other monomer; i.e. cross propagation is preferred over homopropagation. The behavior of most monomers in copolymerizations lies between a polymerization wherein the monomer addition is independent of the unit at the end of the growing polymer species and one in which the monomers have a preference for adding one or the other monomer unit to the growing polymer species. Some polymerization processes have a tendency toward alternation of the monomer addition but do not form perfect alternating polymers.

As used herein, an alternating copolymer, or an alternating copolymer segment, comprises two species of monomeric units in a substantially alternating sequence such that copolymer or segment comprises more than 70% ABA monomer sequences, in certain embodiments the copolymer or segment may preferably comprise more than 80% ABA monomer sequences and, preferably, for some applications the copolymer or segment may comprise more than 90% ABA monomer sequences, wherein A is one monomeric unit and B is the second monomeric unit.

A block copolymer is a copolymer comprising polymeric blocks wherein adjacent blocks are constitutionally different. For example, adjacent blocks may comprise constitutional units derived from different monomeric species or from the same species of monomer but with a different composition or sequence distribution or different stereoregularity of monomeric species. A segment is a part of a polymer, such as, a block, arm, or significant portion of a polymer. The segment may have different characteristics than the rest of the polymer. However, there need not be a sharp transition in composition or properties between the segments of the polymer. A segment does not need to differ in composition but may only differ in stereochemistry, tacticity, sequence distribution or other arrangement of the monomers on the molecular level.

The tendency of alternation of monomers in radical polymerizations is based upon the type of polymerization, the specific comonomers, and the polymerization conditions. There is a strong desire to overcome these tendencies of radical polymerization processes and the limitations of inherent reactivity ratios of various comonomers in copolymerization reactions to increase the level of control over comonomer sequences distribution and increase the concentration of one specific monomer thereby increasing the level of control attainable in synthesis of polymeric materials.

The features and advantages of the present invention may be better understood by reference to the accompanying figures, in which.

Figure 5:
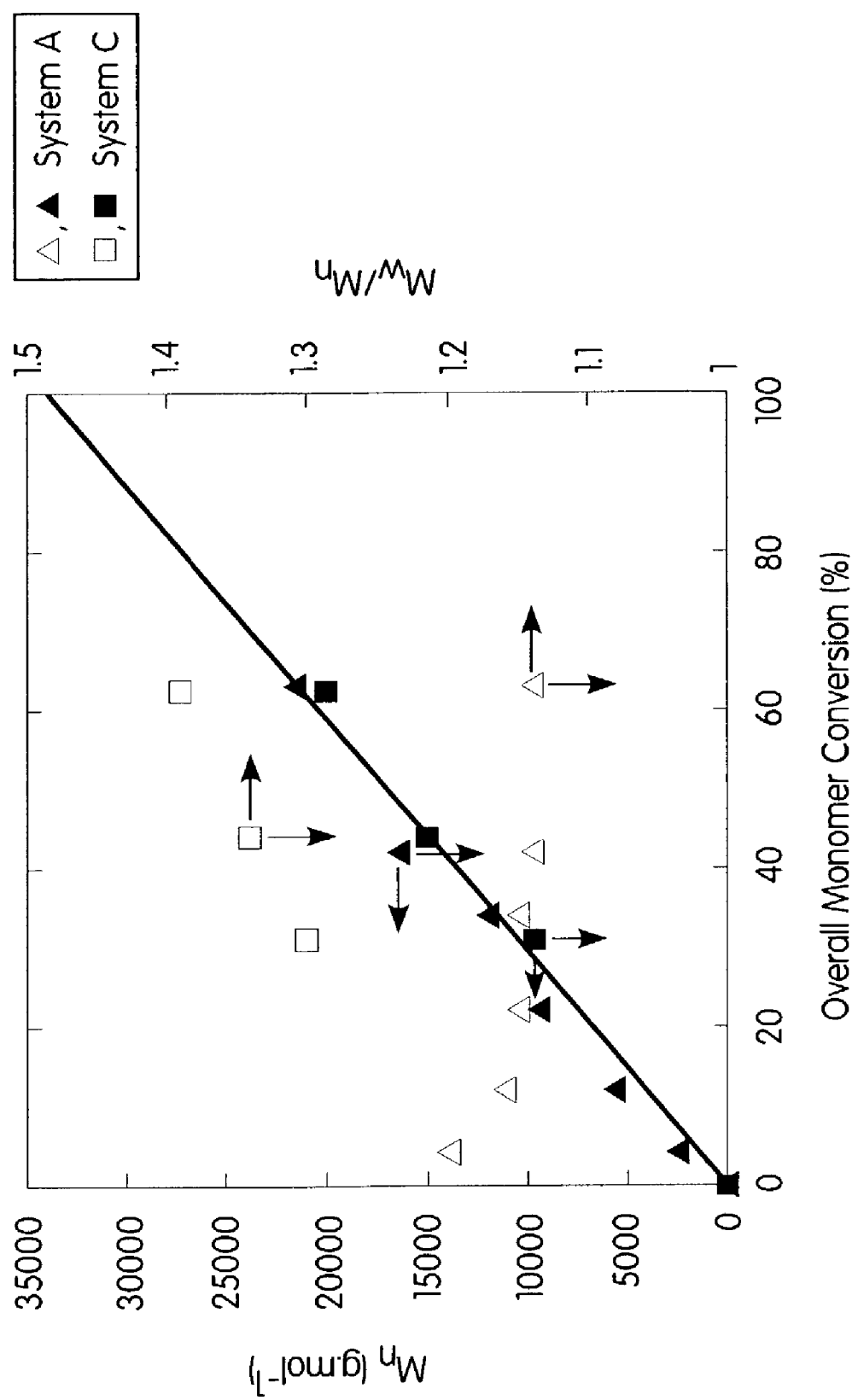
Figure 6:
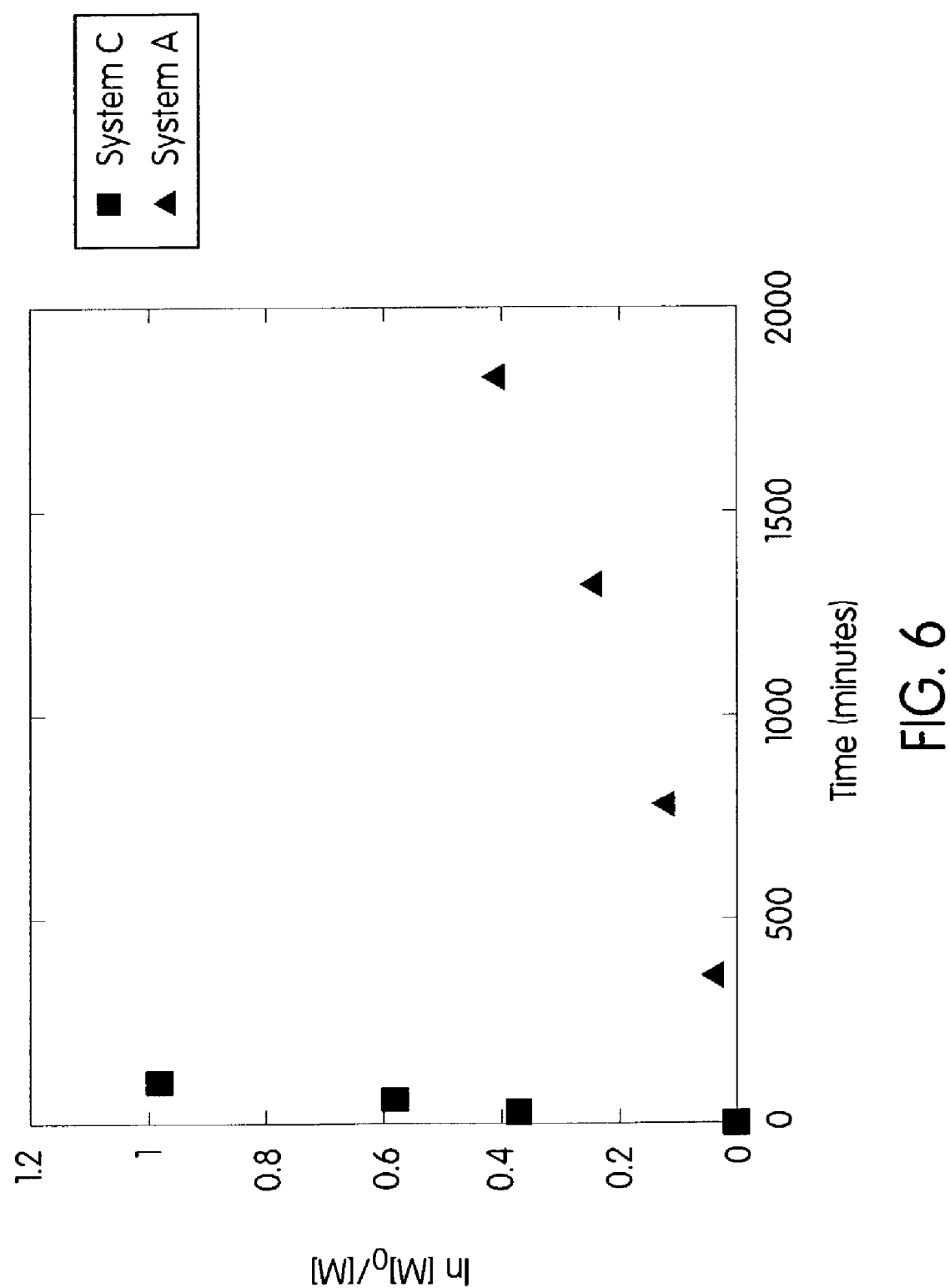
Figure 7A:
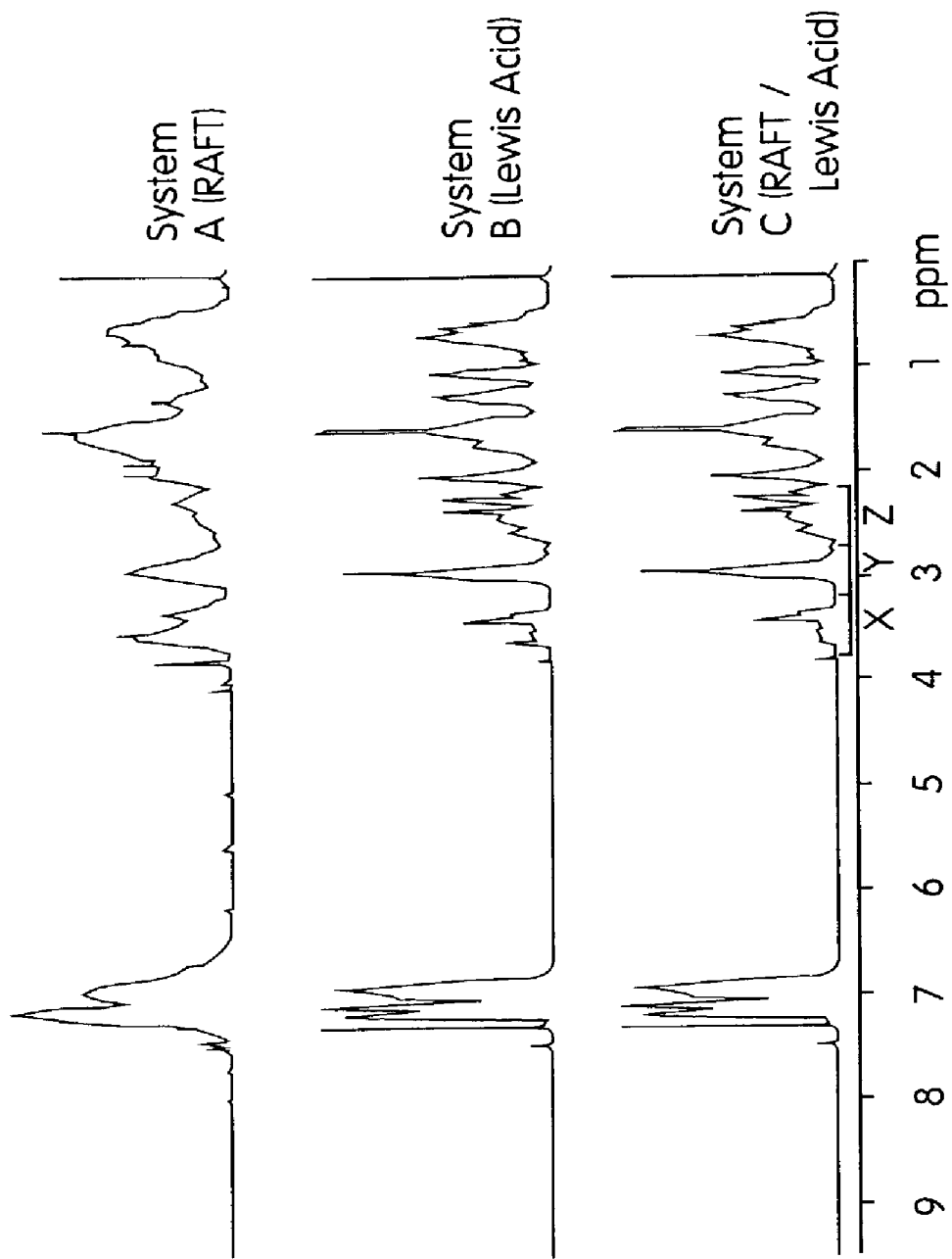
Figure 7B:
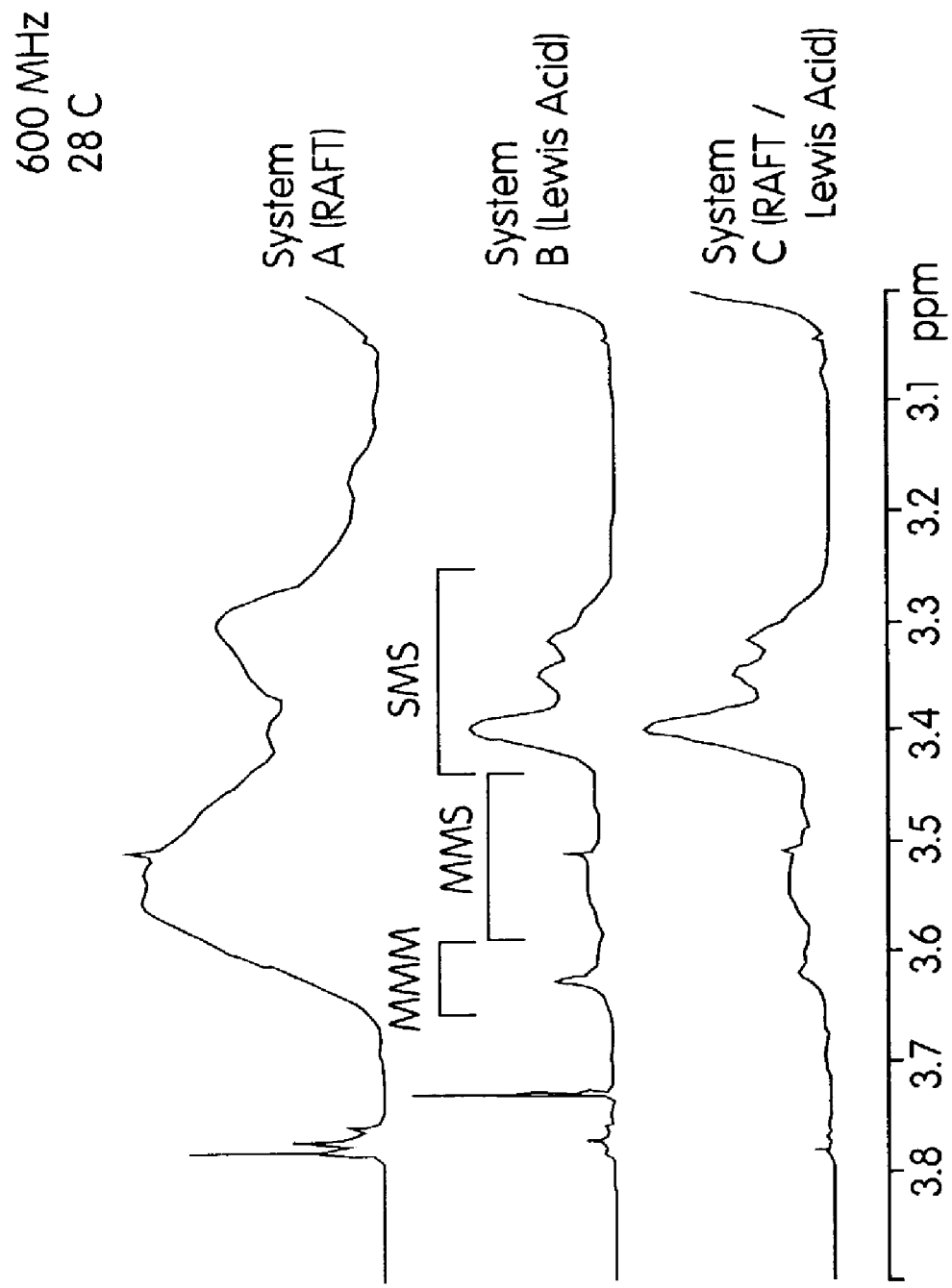
Figure 8:
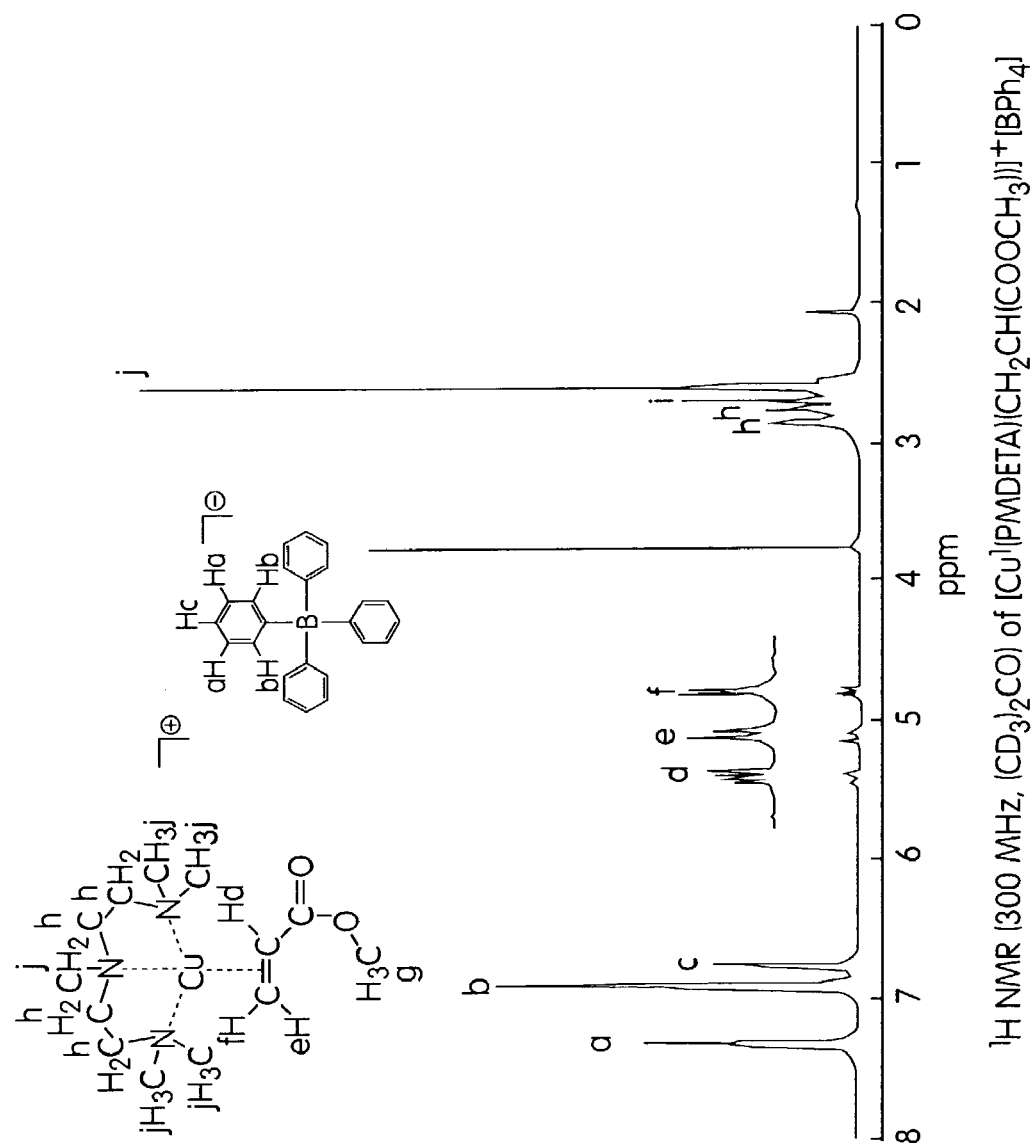
Figure 9:
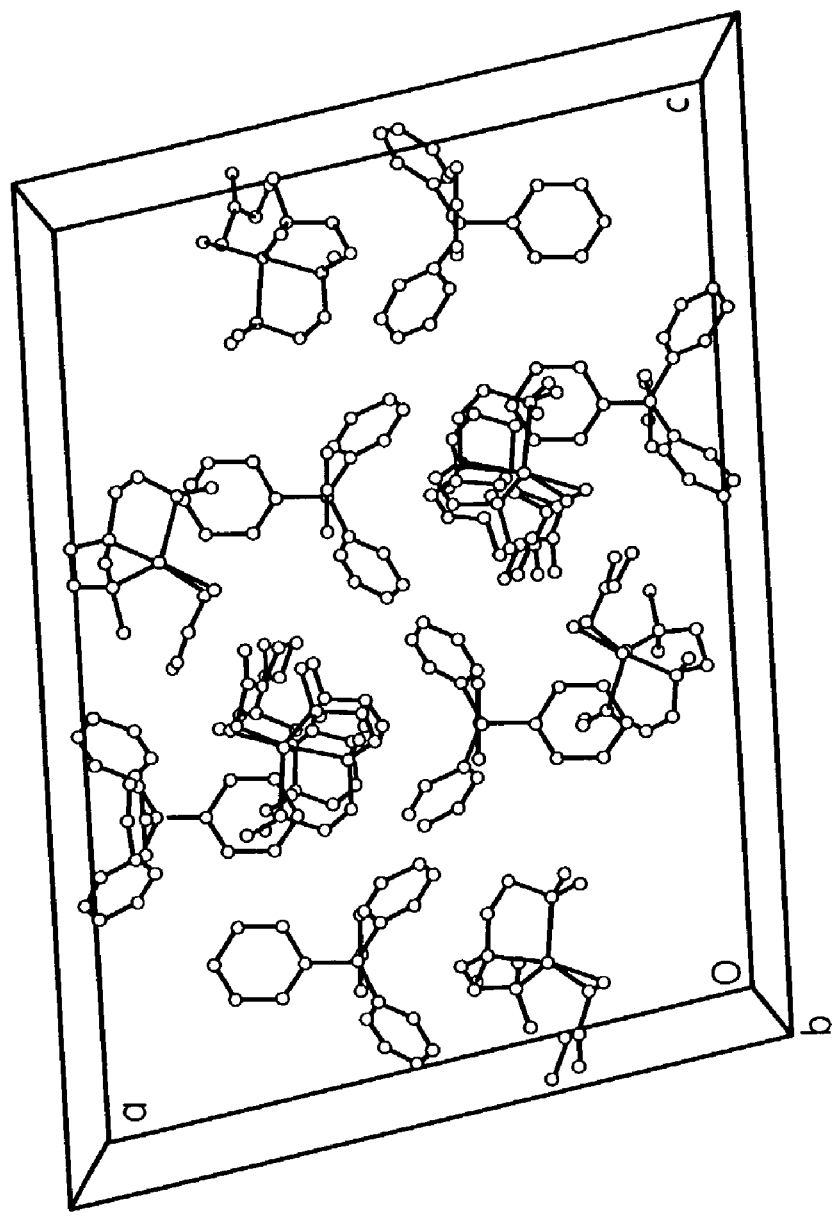
Figure 10:
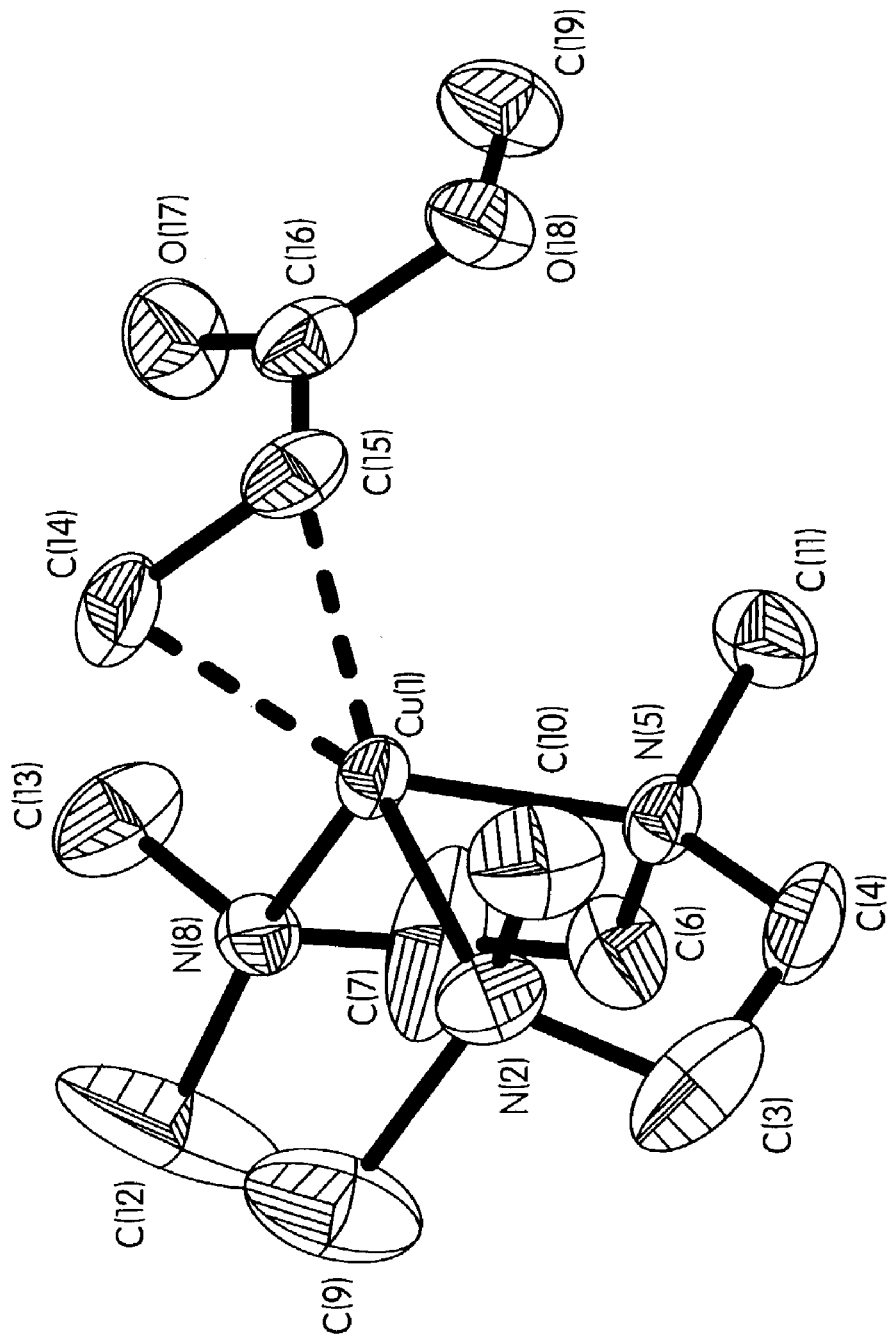
Figure 11:
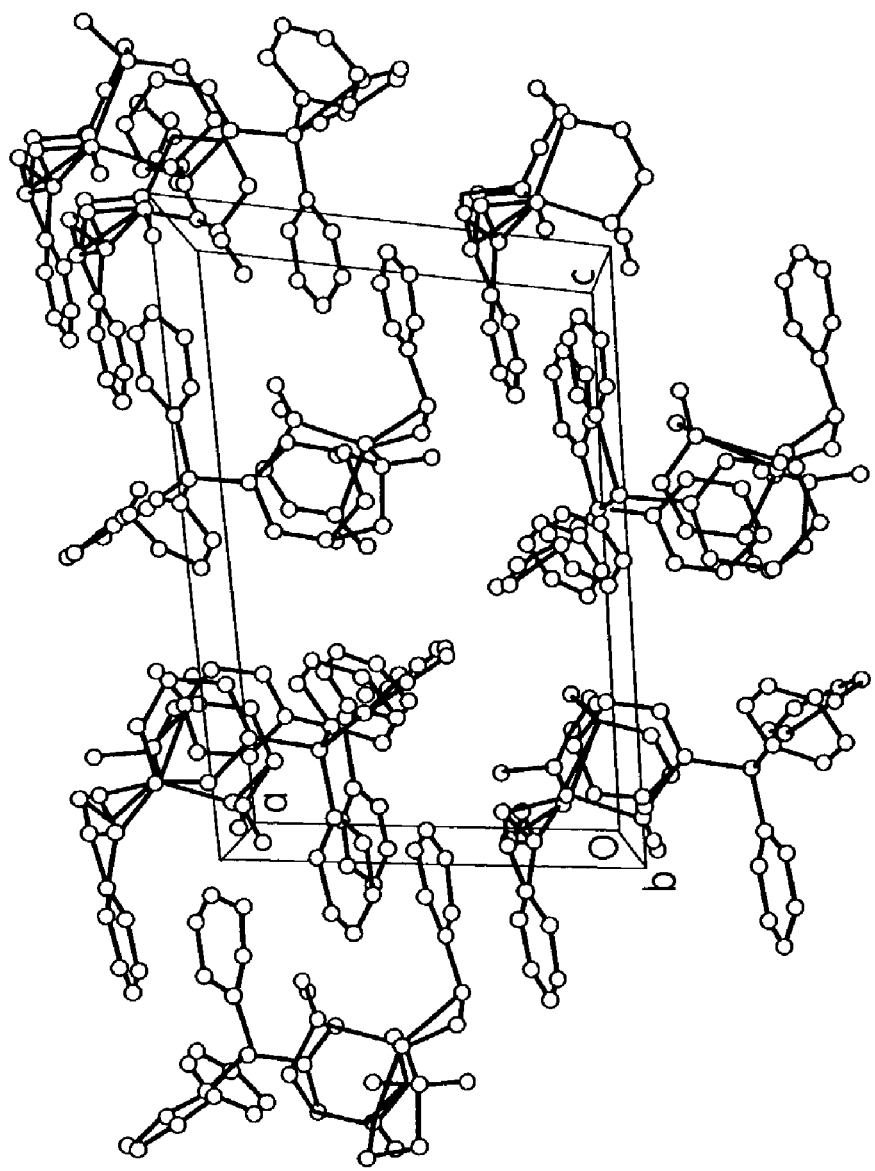
Figure 12:
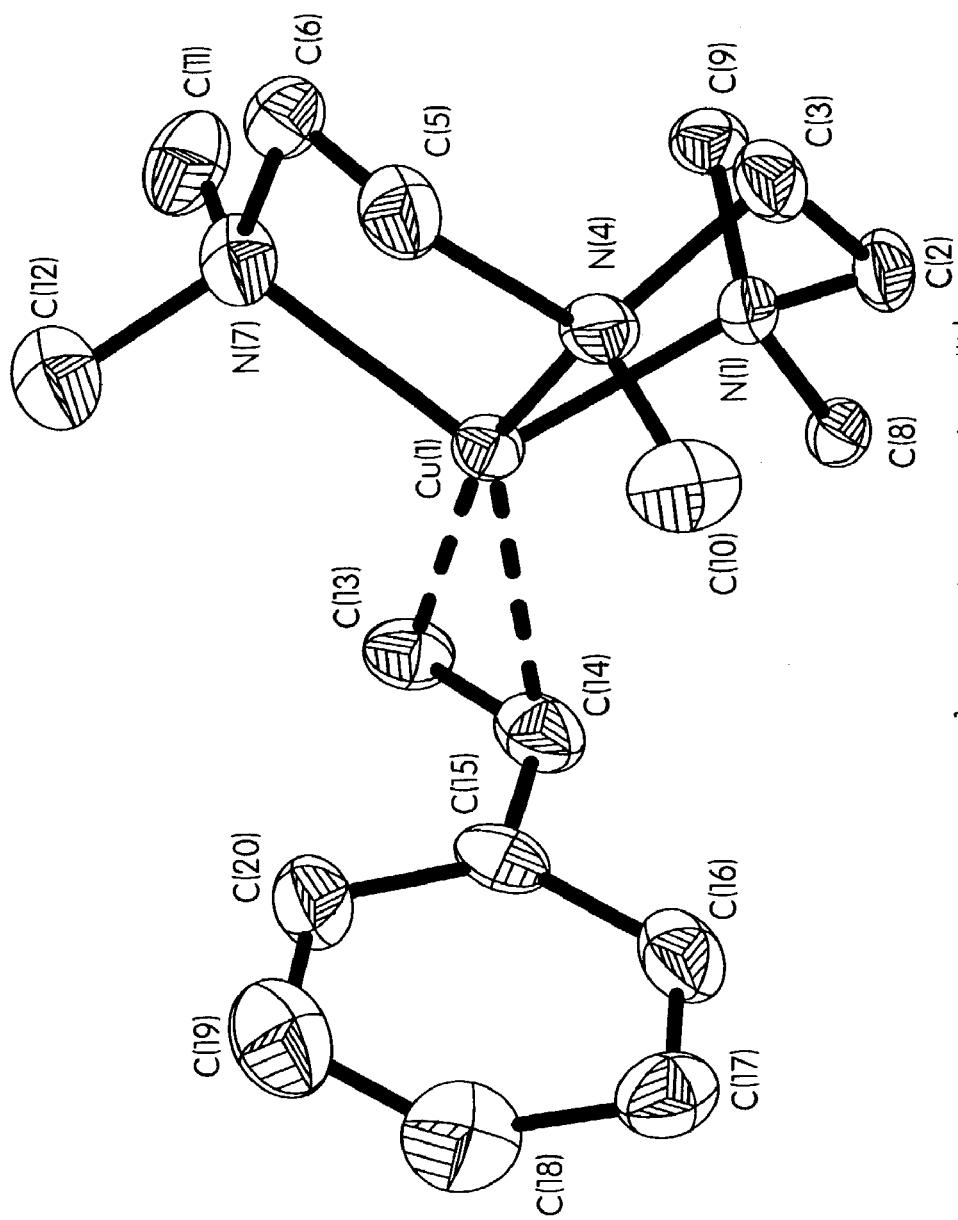
Figure 13:
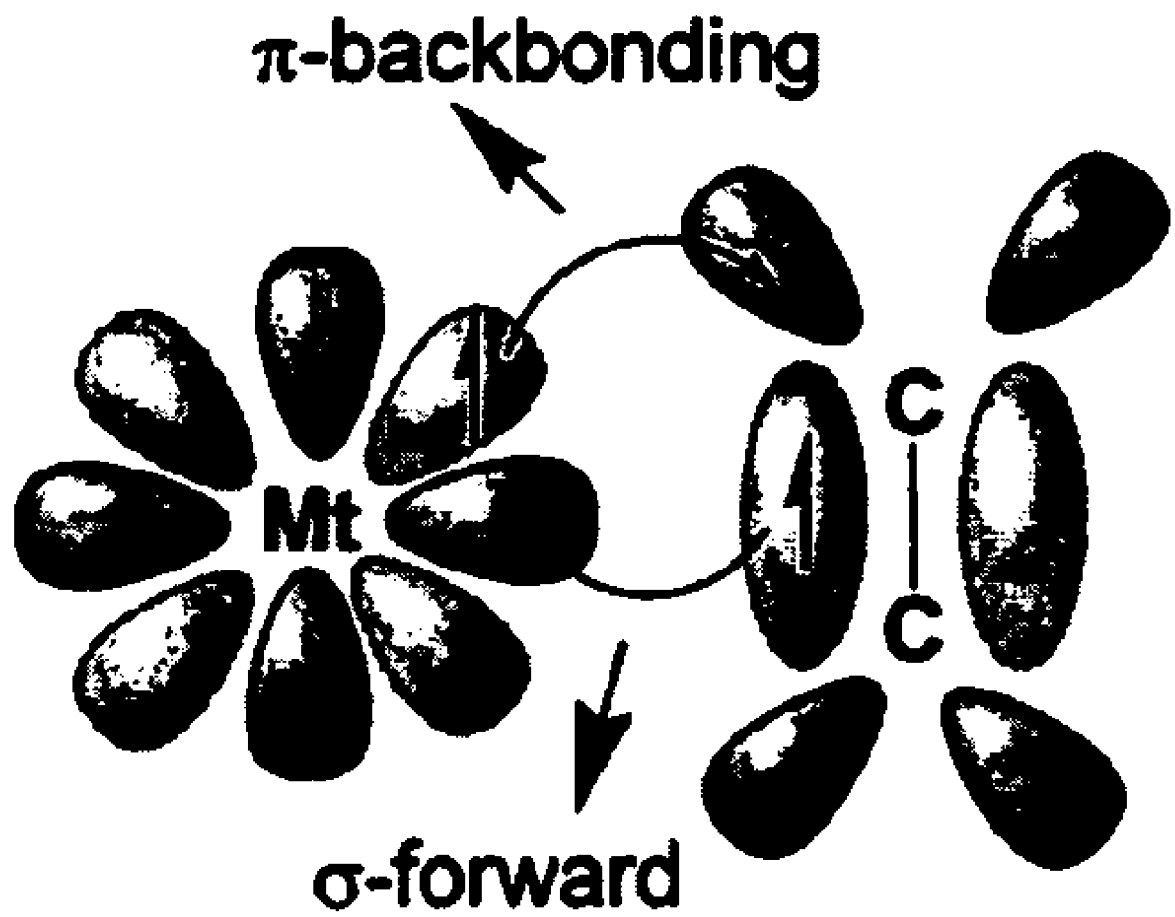

FIG. 5 is a graph of the number-average molecular weight $M_n$ (black symbols) and polydispersity index $M_w/M_n$ (white symbols) as a function of monomer conversion for the bulk copolymerization of methyl methacrylate and styrene at 60° C.: $[S]_0=3.67$ mol.$L^{-1}$; $[MMA]_0=3.67$ mol.$L^{-1}$; $[AIBN]_0=1.96\times10^{-3}$ mol. $L^{-1}$; $[CBD]_0=1.96\times10^{-2}$ mol.$L^{-1}$; $[Et_2AlCl]=0$ mol.$L^{-1}$ (System A), 1.47 mol.$L^{-1}$ (System C). Theoretical $M_n=([MMA]_0+[S]_0)\times$(average monomer conversion.)$\times(104.15+100)/(2(2[AIBN]_0+[CDB]_0))$;

FIG. 6 is a plot of $\ln([M]_0/[M])$ versus time for the bulk copolymerization of methyl methacrylate and styrene at 60° C.: $[S]_0=3.67$ mol.$L^{-1}$; $[MMA]_0=3.67$ mol.$L^{-1}$; $[AIBN]_0=$ 1.96×10$^{-3}$ mol.$L^{-1}$; $[CDB]_0=1.96\times10^{-2}$ mol.$L^{-1}$; $[Et_2; AlCl]=0$ mol.$L^{-1}$(System A), 1.47 mol.$L^{-1}$ (System C);

FIG. 7A is a 600 MHz $^1$H NMR spectra of copolymers PMMA/PS in CDCl$_3$ at 28° C. for system A (RAFT), System B (conventional radical polymerization with an added Lewis acid) and System C (RAFT with added Lewis acid);

FIG. 7B is a section of the 600 MHz $^1$H NMR spectra of copolymers PMMA/PS in CDCl$_3$ at 28° C. for the three (3) systems of FIG. 7A showing the increased tendency toward alternation of systems comprising Lewis acids;

FIG. 8 is a graph of the output of $^1$H NMR (300 MHz, $(CD_3)_2CO$) of the complex of $[Cu^1(PMDETA)(CH_2CH(COOCH_3))]^+[BPh_4]^-$;

FIG. 9 is a graphical representation of the crystal structure of $[Cu^1(PMDETA)(\pi-CH_2\ CH(COOCH_3)][BPh_4]$ viewed along the c-axis;

FIG. 10 is an ORTEP drawing of $[Cu_1(PMDETA)(\pi-CH_2 CH\ (COOCH_3))]^+$ cation where the hydrogen atoms have been removed for clarity;

FIG. 11 is a graphical representation of the crystal structure of $[Cu^1(PMDETA(\pi-CH_2\ CH(C_6\ H_5))][B\ Ph_4]$ viewed along the c-axis; and FIG. 12 is an ORTEP drawing of $[Cu^1(PMDETA(\pi-CH_2 CH(C_6\ H_5))]^+$ cation where the hydrogen atoms have been removed for clarity.

One embodiment of the present invention provides a means of increasing the tendency toward alternating copolymerization of the comonomer units in CRP processes. In another embodiment of the present invention, the complex comprising a monomer increases the tendency of homopolymerization, and changing the distribution of the comonomer in the formed copolymer versus a polymerization without the complex. This embodiment is particularly useful for increasing the concentration of a less reactive comonomer in at least a segment of a copolymer. The complex may comprise the less reactive monomer, thereby enhancing the rate of reaction of the less reactive monomer into the copolymer. The effect of this novel embodiment can be realized in both controlled and uncontrolled polymerization processes. In both embodiments of the invention, the microstructure, or monomer sequence distribution of the polymer is modified, or controlled, by modification of the cross propagation constants in addition to molecular weight, molecular weight distribution and polymer topology of CRP processes.

An embodiment of the method of the present invention is directed to a polymerization process comprising polymerizing first and second monomers under controlled polymerization conditions in the presence of a complex comprising at least one of the monomers. The complex, for example, may further comprise a transition metal in a coordination complex or a Lewis acid in a (co)polymerization process having an acceptor monomer. A Lewis acid may be any chemical substance that can accept a pair of electrons and hence may form a complex with many monomers bearing reactive substituents.

An embodiment of the present invention may initiate or enhance the tendency toward the synthesis of alternating copolymers through radical polymerization of an electron acceptor monomer complex and an electron donor monomer under controlled polymerization conditions. An electron donor is an atom that furnishes a pair of electrons to form a covalent bond or linkage with an acceptor atom. Any electron acceptor monomer may be copolymerized by the method of the present invention, such as, but not limited to, alkyl methacrylates, such as, methyl methacrylate and butyl methacrylate, acrylonitriles, alkyl acrylates, such as, methyl acrylate, as well as other monomers capable of accepting elections. Donor monomers include, but are not limited to, styrene, propylene, vinyl acetate, butadiene, indene, propylene, ethylene, isobutene, hexene, as well as other monomers capable of furnishing electrons to form a bond.

Figure 1:
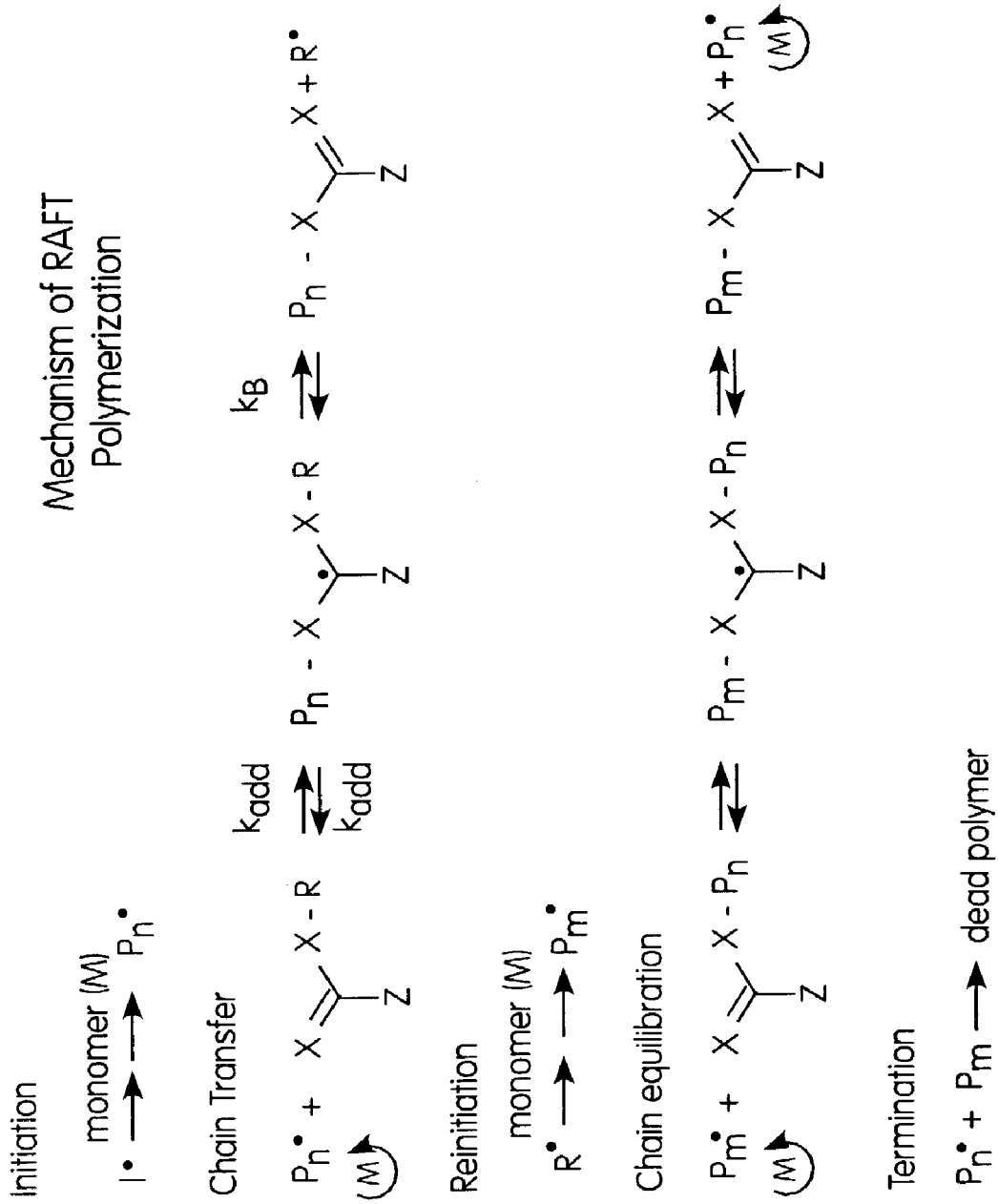
FIG. 1 is the mechanism of a reversible addition-fragmentation chain transfer polymerization process.
Figure 2:
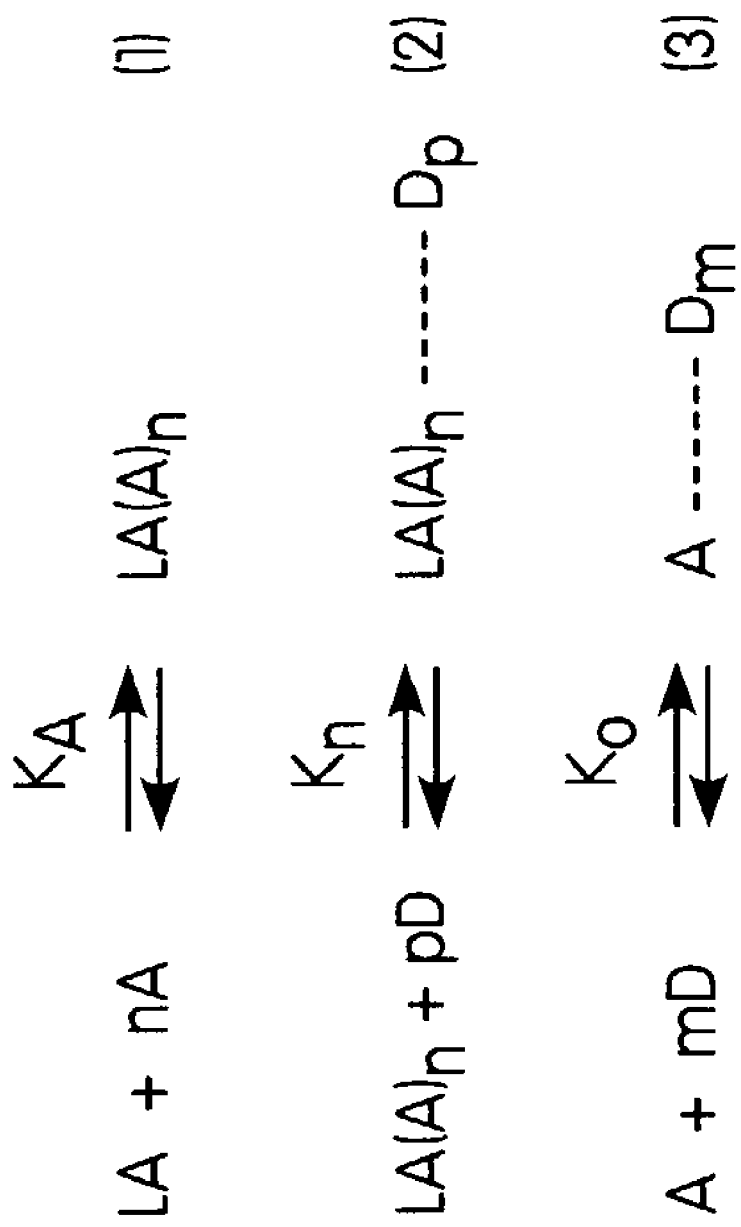
FIG. 2 is a proposed mechanism for synthesis of a ternary complex comprising acceptor monomers, A, donor monomers, D, and a Lewis acid, LA and the resulting chemical equilibrium.

Acrylic monomers, such as, methyl methacrylate and acrylonitrile, typically randomly copolymerize with donor monomers and do not show a tendency toward alternation. However, while copolymerization of methyl methacrylate and acrylonitrile with donor monomers in controlled and uncontrolled radical polymerizations does exhibit an inherent tendency toward an alternating copolymerization, an embodiment of the present invention may significantly increase this tendency toward an alternating copolymerization. For instance, the addition of a Lewis acid to a RAFT polymerization increases the tendency of alternation for these monomers. The Lewis acid may be, for example, alkylaluminum chlorides, zinc chloride, titanium tetrachloride, boron trichloride and tin complexes as well as other Lewis acids described in the literature or known in the art. Without limiting the present invention, several mechanisms are proposed to explain this increase in the tendency toward alternating polymerization. The first mechanism involves the formation a ternary complex comprising the Lewis acid and the two comonomers and, subsequent, polymerization of the complex. In this mechanism, the Lewis acid may initially form a complex with the acceptor monomer. The formation of this initial complex increases the electron-accepting behavior of the complexed acceptor monomer and increases the difference in polarity between the complexed acceptor and donor monomers. With the increased electron accepting behavior, the complexed acceptor monomer may then form a ternary complex with the donor monomer. See FIG. 2. In FIG. 2, the ternary complex includes the Lewis acid, the acceptor monomer and the donor monomer. See Formula 4. In this proposed mechanism, the alternating copolymer results from the "homopolymerization" in the monomers of the ternary complex.

Formula 4

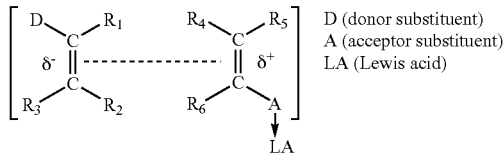

D (donor substituent)
A (acceptor substituent)
LA (Lewis acid)

Figure 3:
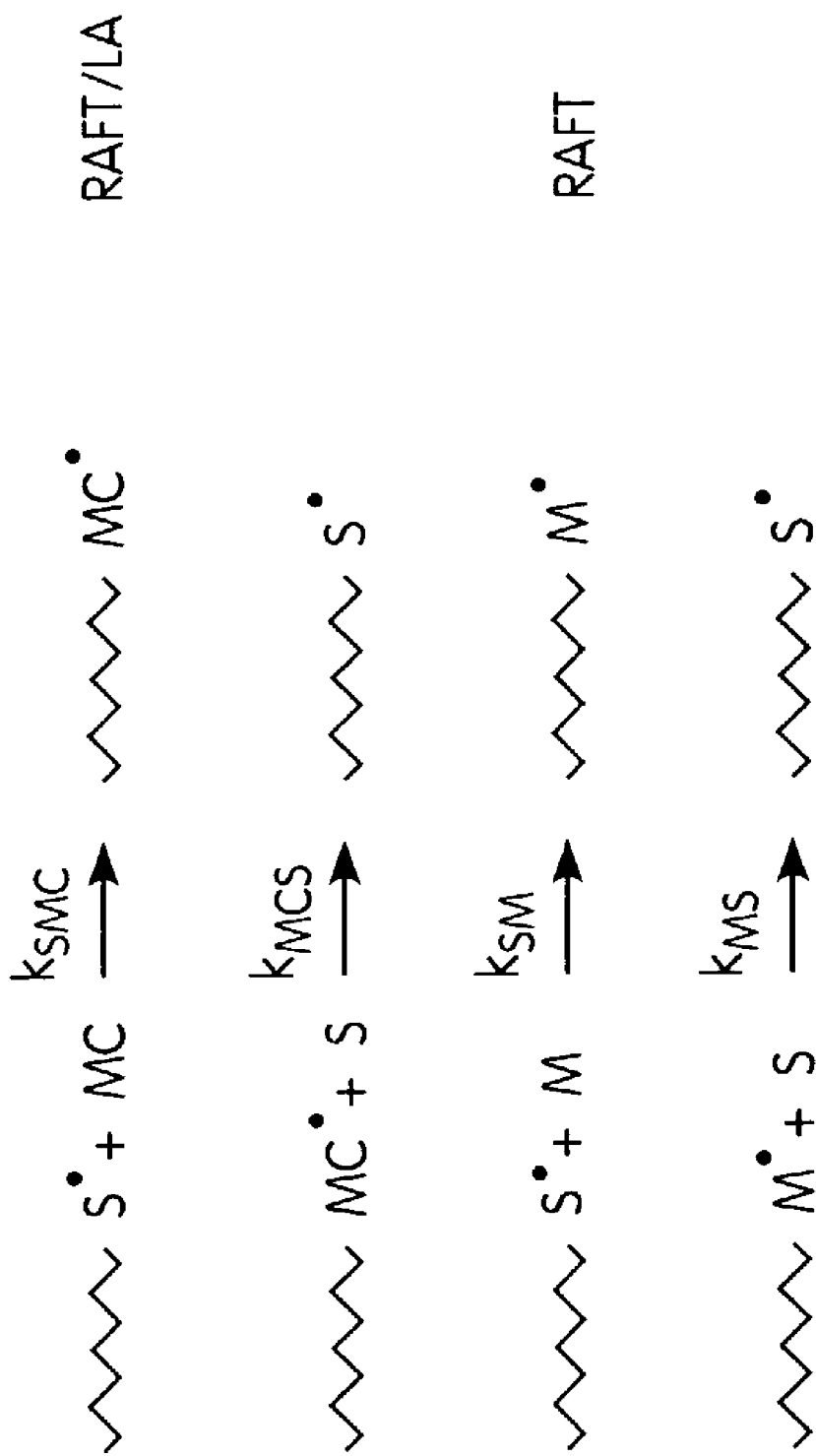
FIG. 3 is a proposed cross propagation mechanism between a complex comprising a Lewis acid and a monomer M and a Monomer S to form an alternating copolymer.

The second proposed mechanism is that the presence of the Lewis acid strongly enhances the cross propagation rate constants. See FIG. 3. The presence of the complexed monomer results in a strong effect of the unit at the end of the growing polymer species on the addition of the next monomer. In the presence of the Lewis acid, the monomer attached to the end of the growing polymer chain will preferentially react with a different monomer species thereby increasing the tendency toward alternating copolymerization. In FIG. 3, the rate constants $k_{SMC}$ and $k_{MCS}$ are greater than $k_{SM}$ and $k_{MS}$ and very much greater than $k_{SS}$ or $k_{MCMC}$.

Figure 4:
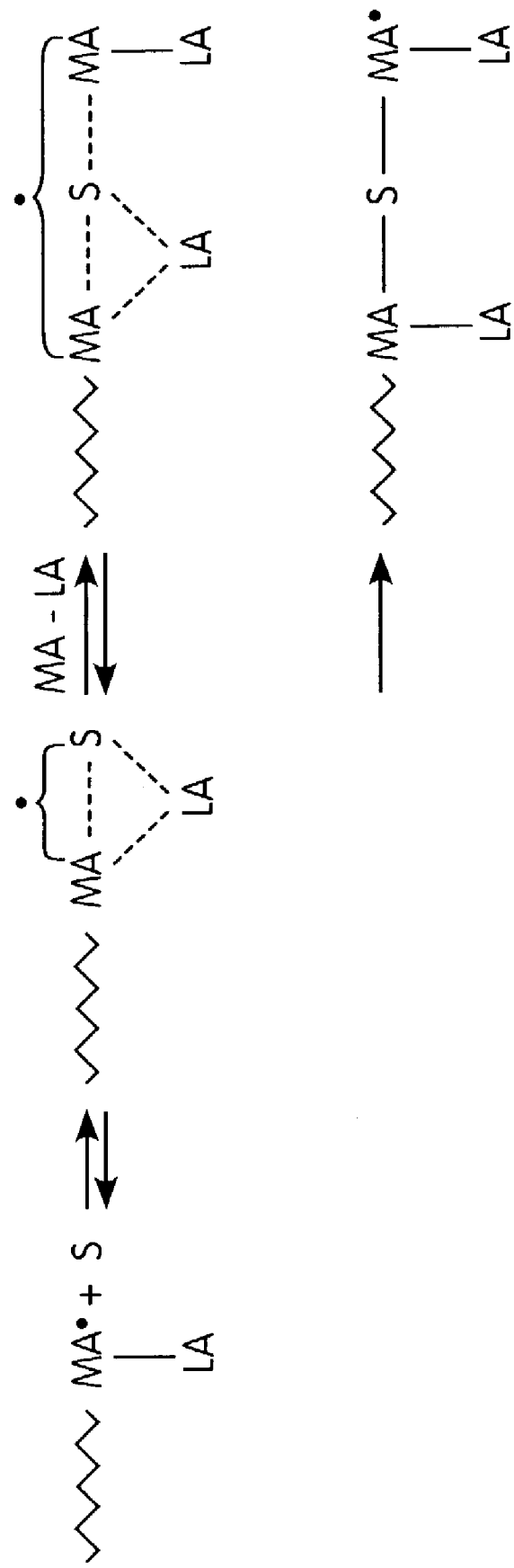
FIG. 4 is a proposed radical complex mechanism wherein the radical end of the acceptor monomer is complexed with a Lewis acid to form an active site for addition of a donor monomer.

A third proposed mechanism involves the formation of a ternary complex, however, the Lewis acid forms an initial complex with the radical end of the acceptor monomer. See FIG. 4. This initial complex has an active site that may then complex with the donor monomer before forming another complex with a second acceptor monomer complex thereby reforming the first radical acceptor monomer chain end.

Another embodiment of the process of the present invention, comprises copolymerizing two acceptor monomers with one donor monomer to form a copolymer. The polymer prepared by this embodiment may comprise an alternating sequence distribution between acceptor monomers and donor monomers. However, the copolymerization may be controlled to form a gradient of acceptor monomers along the length of the copolymer. This is exemplified by consideration of the sequence distribution of each acceptor monomer in a polymer sequence which depends on the concentration of monomers, the influence of the complexing agent and relative reactive reactivities of the monomers. The sequence distribution of the acceptor monomers in the final terpolymer results from the differences in rate of formation of a complex between the two different acceptor monomers and the added Lewis acid. This embodiment allows synthesis of novel copolymers wherein the monomer distribution along the backbone results from control over two macromolecular engineering aspects, monomer sequence control and controlled/living polymerization of a reaction mixture with changing monomer composition.

The addition of Lewis acids to a controlled polymerization, while retaining control, was not an easy process and although the first examples below comprise RAFT as the exemplary process for controlled polymerization of radically polymerizable monomers, the method of the present invention may be used with any CRP process, including RAFT, ATRP, SFRP, NMP, or other transfer processes such as degenerative transfer with iodine. With the information disclosed herein, one skilled in the art will be able to chose a Lewis acid that does not interact, or minimally interacts with the initiator, the catalyst of ATRP or the transfer agent of RAFT and but interacts with a monomer to enhance the tendency of formation of alternating copolymers under the controlled polymerization conditions of these polymerization processes.

In ATRP, the catalyst complex is formed by addition of a transition metal salt and optionally a ligand to the polymerization medium. In one embodiment of the present invention, the transition metal additionally forms a complex comprising a donor monomer. This complex may modify the reactivity of the complexed monomer in a (co)polymerization reaction, as discussed above for Lewis acid complexed monomers in uncontrolled radical polymerizations. In the case of tridentate nitrogen based ligands commonly used in the ATRP, such as PMDETA and tNtpy (Formula 5 and 6.), the monomer may additionally coordinate to the copper(I) center.

Formula 5

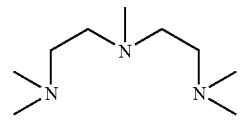

N, N, N', N", N"-pentamethyldiethylenetriamine
PMDETA

Formula 6

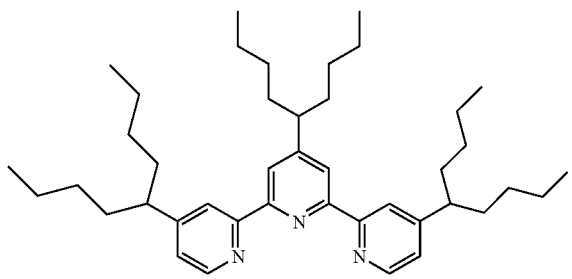

4, 4', 4"-tris(5-nonyl)-2, 2':6', 2"-terpyridine
tNtpy

Analysis of the complex by EXAFS in polar and nonpolar medium were consistent with the presence of neutral [$Cu^I$(PMDETA)Br] and [$Cu^I$(tNtpy)Br] complexes. Though not wishing to be limited by the proposal of a mechanism, it is believed that Br dissociation from [$Cu^I$(PMDETA)Br] and [$Cu^I$(tNtpy)Br] may lead to the formation of coordinatively unsaturated [$Cu^I$(PMDETA)]$^+$ and [$Cu^I$(tNtpy)]$^+$ cations, in which the empty coordination sites may then be further occupied by a vinyl monomer or the solvent. The equilibrium constant for such substitution may strongly depend on solvent polarity, counterion, reaction temperature and the concentration of vinyl monomer.

The coordination of olefins and vinyl monomers to transition metals has been a subject of numerous reviews. Generally, a metal-olefin complex can be considered either as a π-complex, in which the olefin occupies one coordination site, or a complex with two σ bonds between the metal and olefinic carbon atoms. In the latter case, the metal oxidation state is increased by two.

For π-complexes, the transition metal-olefin coordinate bond, according to the Dewar-Chaft model, can be generally described as composed of σ and π components. As indicated in Scheme 1, the σ-component involves overlapping of the occupied bonding π orbital of the olefin with vacant σ-type metal orbital. The $π^*$ component represents back-bonding and involves overlapping of the vacant anti bonding π orbital of the olefin with filled metal d orbital. The relative contributions of these components depend on several factors:

(a) charge and number of d-electrons in transition metal,
(b) basicity of the complexing ligand,
(c) coordinating ability of the counterion, and
(d) electron withdrawing/donating groups on the olefin.

The discovery disclosed herein was initiated by the successful isolation of two novel copper(1)/PMDETA complexes; one complex with coordinated methacrylate and the other with coordinated Styrene. Isolation of these complexes instigated a completely new look at the reactivity of transition metal complexed monomers in controlled polymerization reactions. Methyl methacrylate may not as readily form a complex with copper based complexes since the methyl substituant on the double bond precludes close approach to the bonding site. Detection of such coordination using EXAFS is difficult due to the relatively weak absorbencies of carbon atoms. In principle, it is proposed that the starting $Cu^I$Br complex with 1 eq. of PMDETA exists as a mixture of $Cu^I$(PMDETA)Br and [$Cu^I$(PMDETA)(Monomer)]$^+$ [Br]$^-$. Monomer coordination is favored in the presence of non-coordinating anions such as $BPh_4^-$, $PF_6^-$, $ClO_4^-$, and $CF_3SO_3^-$. Other possibilities, proposed previously, such as [$Cu^I$(PMDETA)][$Cu^I$Br$_2$] are also feasible. After the initial discovery of complex formation with styrene and methyl acrylate the possibility that this was a general phenomenon was confirmed by the preparation and examination of monomer complexes with 4-vinyl pyridine and hexane, two monomers with different polarity.

Additionally, complexation can occur through other functional groups present on the monomer. A review paper by Jones describes numerous coordination complexes with substituted olefins employing a range of transition metals. Complexes were formed with amines, acids, aldehyde, ketones, alcohols, ethers and nitriles and substituted phenyl compounds through S, O, P and N atoms present in the monomer. Many of the transition metals known to participate in ATRP, including, but not limited to, Cu, Fe, Rh, Ni, Co, Mn, as discussed in commonly assigned application cited herein, in addition to transition metals active in olefin polymerization, when suitably complexed with appropriate ligands, have been shown to form complexes with substituted olefins The changes in reactivity ratio of the complexed monomers were determined by the rate of incorporation of the complexed monomer into a copolymer versus the rate of incorporation of an uncomplexed monomer.

We have determined that in non-ATRP copolymerization reactions, the copper complexed monomer has a significantly different reactivity than the uncomplexed monomer. This difference in reactivity takes two forms, one is a change in the rate of the copolymerization reaction and the other is a change in the reactivity ratio of the complexed monomer in a copolymerization reaction. As noted in the examples set forth below, a standard free radical copolymerization run with complexed styrene and a non-complexed acrylate produces a copolymer with a much higher percentage of styrene than expected for a copolymer produced by an AlBN initiated conventional free radical copolymerization. However, the polymerization rate for homopolymerization of styrene in the presence of the $Cu^I$ complex was found to be identical to free AlBN initiated homopolymerization. These experiments indicate that the rate of the cross propagation reaction is changed by the coordination of the monomer, not the rate of self propagation in a homopolymerization; the rate of cross propagation is decreased in the presence of the complexed monomer. The gross effect is therefore similar to the effect seen with Lewis acid complexed monomers; i.e. the cross propagation rate constants are changed in the presence of complexed monomers.

Similarly, in a reaction of a complexed olefin, for example, hexene, with methyl methacrylate monomer, the reactivity of the complexed monomer is changed in the copolymerization process. In this embodiment, the reactivity is enhanced, and the formed copolymer contains much higher levels of hexene that would be expected in a conventional copolymerization of two uncomplexed monomers. Methyl methacrylate has lesser tendency to coordinate to the transition metal than styrene, methyl acrylate and hexane because of the steric hindrance introduced by the α-methyl group.

The method of the present invention may be applied to any copolymerization process and only requires that the complex does not adversely interact with the control of the polymerization. This may require that in some controlled polymerization processes the reaction mediator or conditions of the controlled polymerization be selected to reduce such interactions. For example, in some ATRP processes the catalyst may be formed with acidic ligands and if Lewis acids are going to be added to complex with the monomers and increase the tendency to form an alternating copolymer. The selection of acidic ligands may reduce the interaction between the catalyst and the Lewis acid complex.

The present invention may be further understood by reference to the following examples. The following examples are merely illustrative of the present invention and are not intended to limit its scope.

EXAMPLES

Example 1

One embodiment of the invention comprises a RAFT copolymerization of methyl methacrylate and styrene in the presence of a Lewis acid. In this example, this embodiment of the present invention is compared to a conventional RAFT copolymerization, and a conventional radical polymerization of methyl methacrylate ("MMA") and styrene ("S") in the presence of a Lewis Acid.

Example 1.1 is an embodiment of the present invention wherein the polymerization process is conducted under RAFT polymerization conditions additionally comprising a complex comprising methyl methacrylate and diethyl aluminum chloride, $Et_2AlCl$. This embodiment combines control of molecular weight (MW) and polydispersity (PDI) with the control of monomer sequence distribution. The kinetic behavior of this embodiment of the present invention and the microstructure of the synthesized copolymer are compared to both a conventional RAFT polymerization and a conventional radical polymerization to exemplify the superior level of control of the present invention. RAFT polymerizations will only provide control over molecular weight and PDI, and conventional radical polymerization in the presence of $Et_2AlCl$ will only provide monomer sequence control. This embodiment of the present invention, however, combines control over molecular weight, PDI and monomer sequence.

Example 1.1

RAFT Polymerization in the Presence of Lewis Acids

A complex comprising a monomer was prepared with dried methyl methacrylate (1.86 g, 18.6 mmol) and diethyl aluminum chloride (0.89 g, 7.44 mmol) when both reagents were added to a Schlenk flask in a glove box. The mixture was stirred for four hours in order to form the initial complex between the Lewis acid and the acceptor monomer, methyl methacrylate. Then, a degassed solution of 2,2'-azobisisobutyronitrile (AIBN) (1.63 mg, 0.0099 mmol) and cumyl dithiobenzoate (CDB) (27 mg, 0.099 mmol) dissolved in dried styrene (1.93 g, 18.6 mmol) was added via a degassed syringe. The mixture was stirred in an oil bath thermostated at 60° C. and samples were withdrawn through a degassed syringe at timed intervals. Monomer conversion after each interval was determined by gravimetry analysis on the crude samples. Average molecular weight and polydispersities were measured by size exclusion chromatography calibrated with poly(methyl methacrylate) standards.

Example 1.2

RAFT Polymerization in the Absence of Lewis Acids

Methyl methacrylate (1.86 g, 18.6 mmol), styrene (1.93 g, 18.6 mmol), of 2,2'-azobisisobutyronitrile (1.6 mg, 0.0099 mmol) and cumyl dithiobenzoate (27 mg, 0.099 mmol) were added to a dry Schlenk flask. The mixture was thoroughly purged by nitrogen flushing then heated at 60° C. Analysis conditions were the same as above.

Results and Discussion

The copolymerization of methyl methacrylate and styrene have been compared under three different polymerization conditions:
  System A, example 1.2, is a conventional controlled RAFT copolymerization without a Lewis acid;
  System B is a conventional radical copolymerization in the presence of a Lewis acid, $Et_2AlCl$;
  System C, example 1.1, is an embodiment of the present invention including a RAFT copolymerization in the presence of a Lewis acid, $Et_2AlCl$.

Table 1 shows the molar ratios between the compounds used in the polymerization of each of the three systems.

TABLE 1

Initial molar ratios of all reagents

| System | MMA | AlEt$_2$Cl | S | AIBN | Cumyl thiobenzoate |
|---|---|---|---|---|---|
| A | 200 | — | 200 | 0.1 | 1 |
| B | 200 | 80 | 200 | 0.1 | — |
| C | 200 | 80 | 200 | 0.1 | 1 |

TABLE 2

Final experimental results

| System | Time (hours) | Final overall monomer conversion (%) | M$_n$ experimental (g · mole$^{-1}$) | M$_w$/M$_n$ | M$_n$ theoretical (g · mole$^{-1}$) |
|---|---|---|---|---|---|
| A | 73 | 63 | 21,600 | 1.14 | 21,420 |
| B | 0.8 | 60 | 112,000 | 2.70 | — |
| C | 1.6 | 62.5 | 20,000 | 1.38 | 21,250 |

The kinetic behavior of these three polymerization systems was analyzed to determine the effect of each system on molecular weight control, molecular weight distribution control and monomer sequence, or microstructure, control. $^1$H NMR analysis of the microstructure of the synthesized copolymers were compared to examine the sequence control or degree of alternating copolymerization. One skilled in the art would readily understand that other complex forming agents may also be used to that would allow control over the stereochemistry of copolymers. An example would be complexation of a monomer with a perfluro-substituted complexing agent which can modify the approach of the monomer(s) to the growing polymer chain end.

All the reactions were stopped when the copolymerization mixtures became glassy. Table 2 shows, the average final monomer conversion, final average molecular weights and polydispersities for each system. For both copolymerizations performed under RAFT controlled polymerization conditions, Systems A and C, final molecular weights are close to the expected theoretical values and polydispersity indexes are less than 1.5, indicating a controlled polymerization. On the other hand, for system B, as expected for a conventional radical process, not performed under conditions of a controlled polymerization process, the final molecular weight is higher than predicted by the ratio of consumed monomer to the introduced initiator and the polydispersity index is high, PDI>2. These results show that system A and C allow one to synthesize copolymers with predetermined molecular weights and low polydispersities, below 2.0, and that the addition of the Lewis acid to system C did not alter the controlled nature of the RAFT polymerization. Further since only systems B and C, with added Lewis acid allowed preparation of PMMA-alt-S copolymers only system C allowed both the preparation of a PMMA-alt-S copolymer with predetermined molecular weights and narrow polydispersity, FIG. 5 compares the plots of molecular weights Mn and polydispersities Mw/Mn versus conversion for systems A and C. In both cases, molecular weight increase linearly with conversion and the experimental values are close to the theoretical ones. This behavior also indicates that the RAFT copolymerization of MMA and styrene under these conditions is controlled, not only in the absence but also in the presence of $Et_2AlCl$.

However, experimental polydispersity indexes are higher for the embodiment of the present invention of system C than system A; 1.38 to 1.14. It is possible that in the presence of $Et_2AlCl$, the cumyl dithiobenzoate end groups may be complexed by the Lewis acid. In the experiment, formation of such a complex was evidenced by the formation of an intense orange color. This additional complexation, perhaps due to steric and electronic effects, could reduce the rate of the controlling exchange process in the RAFT system or could enhance it to a lesser degree than the rate of propagation is enhanced. A net reduction in control may explain the observed broadening of polydispersity. This effect of an additional interaction between an added complexing agent, such as a Lewis acid, and the RAFT reversible addition-fragmentation chain transfer agent may be exploited to affect the equilibrium of the conditions of the RAFT polymerization process and control the rate of reaction, (see below) or as above, modify molecular weight distribution and provide monomer sequence control.

Semilogarithmic curves of conversion with time have been plotted for systems A and C. See FIG. 6, The comparison of the slopes of the curves indicate that the rate of polymerization of system C is about 40 times higher than the rate of polymerization of system A. This behavior may be due to the fact that the value of the cross propagation rate constants in the presence of $Et_2AlCl$ are markedly higher than in the absence of $Et_2AlCl$. At 20° C., the addition rate constant of the complex MMA/Lewis acid onto the styryl radical (kS-MC=2600 l.mol-1.s-1) is almost 40 times higher that the one of MMA (kS-M=70 l.mol-1.s-1). The rate constant of addition of styrene to the complexed methacrylic radical (kMC-S) has not been precisely determined but is also assumed to be higher than the rate constant of addition of styrene on methacrylic radicals (kM-S). Consequently, the apparent rate constant of propagation is significantly higher for system C than system A, which may also explain the enhancement of polydispersity observed for system C. However, although the kinetic behavior of systems A and C is different, in both cases the copolymerization of MMA and styrene was conducted under conditions of a controlled polymerization and in case C an alternating copolymer was prepared.

FIG. 7 compares the $^1H$ NMR spectra of the copolymers synthesized via systems A, B and C. The whole region from 3.7 ppm to 2.1 ppm is representative of the PMMA methoxy protons. This range can be subdivided into three subregions 3.7–3.15 ppm (X), 3.15–2.7 ppm (Y) and 2.7–2.1 ppm (Z), which are respectively representative of the MMA centered triads including none, one and two meso MMA-S diads. The fractions of the various MMA ("M") centered triads (MMM (homopolymer), MMS/SMM (random), SMS (alternating)) may be correlated to the areas X, Y, Z of the methoxy resonance of the copolymer (Equations 1–3).

$$F_x = F_{MMM} + 2(1-\sigma)F_{MMS} + (1-\sigma)^2 F_{SMS} \quad (1)$$

$$F_y = 2\sigma F_{MMS} + 2\sigma(1-\sigma)F_{SMS} \quad (2)$$

$$F_z = \sigma^2 F_{SMS} \quad (3)$$

Where σ represents the probability of alternating M and S units having the same "coisotactic" configurations, with the assumption that σ is constant regardless of the sequence of addition (i.e. $\sigma=\sigma_{MS}=\sigma_{SM}$).). This σ parameter may be calculated from Eq. 4:

$$\sigma=(1-F_x^{1/2})(1+r_M f_M/f_S)=(1+r_M f_M/f_S)/(1+2F_x/F_y) \quad (4)$$

where $r_M$ is the reactivity ratio of the methacrylic radical, $f_M$ is the mole fraction of methyl methacrylate in the monomer feed and $f_S$ is the mole fraction of styrene in the monomer feed.

TABLE 3

Proportion of three methoxy regions in the NMR spectra and coisotacticity index

| System | $F_x$ | $F_y$ | $F_z$ | σ |
|---|---|---|---|---|
| A | 0.499 ± 0.001 | 0.404 ± 0.001 | 0.096 ± 0.003 | 0.430 ± 0.001 |
| B | 0.272 ± 0.001 | 0.478 ± 0.001 | 0.249 ± 0.003 | 0.516 ± 0.001 |
| C | 0.259 ± 0.001 | 0.497 ± 0.001 | 0.244 ± 0.003 | 0.530 ± 0.001 |

Table 3 shows the value of $F_x$, $F_y$, $F_z$ and σ for systems A, B and C. The areas X and Y can be determined by direct integration of the NMR spectra Due to an overlap with the methine region, the area Z could not be measured by integration. O'Driscoll et al. have shown that the area Z may be calculated by using Equation 5.

$$\text{Area } Z = (3/8)(F_M)(\text{Total area of the spectra}) - \text{Area } X - \text{Area } Y \quad (5)$$

The monomer compositions of the copolymer $F_M$ and $F_S$ were determined by elemental analysis and were both equal to 0.5 in all cases. The reactivity ratio $r_M$ is equal to 0.08 in the presence of $Et_2AlCl$ and 0.47 in the absence of $Et_2AlCl$.

The data in Table 3 allows calculation, through use of Eq. 1–3, of the fractions of the MMA centered triads (Table 4).

TABLE 4

Experimental calculations of the fractions of MMA centered triads

| System | $F_{SMS}$ (%) | $2F_{MMS}$ (%) | $F_{MMM}$ (%) |
|---|---|---|---|
| A | 51.9 ± 1.5 | 34.8 ± 1.5 | 13.2 ± 3 |
| B | 93.5 ± 1.5 | 2.1 ± 1.5 | 4.3 ± 3 |
| C | 86.8 ± 1.5 | 12.2 ± 1.5 | 1 ± 3 |

For system A, the proportion of random triads MMS/SMM is equal to 34.8%. This result indicates under conditions of a controlled polymerization in the absence of Lewis acid, the synthesized copolymer has a low tendency towards alternation. On the other hand, for systems B and C, the predominant structure is the alternating triad SMS. The copolymers synthesized in the presence of $Et_2AlCl$ have a greater tendency for alternation. In the presence of Lewis acid and under conditions of a controlled polymerization process, system C allows synthesis of alternating copolymers PMMA-alt-S with predetermined molecular weight and narrow PDI.

Inside the region from 3.2 ppm to 3.7 ppm, the signal is broad for system A. This behavior indicates that in the absence of Lewis acid, the synthesized copolymer is predominantly statistical or not alternating under the controlled polymerization conditions. On the other hand, for system B and C, inside the range 3.2–3.7 ppm, it is possible to distinguish three peaks. It has been shown by Hirai and others that the particular region 3.2–3.7 ppm gives representative information about the copolymer sequencing. Inside this region, it is possible to distinguish three peaks: a peak from 3.25 ppm to 3.44 ppm due to the alternate triad SMS, a peak from 3.44 ppm to 3.58 ppm due to the random triad MMS and a peak from 3.58 ppm to 3.64 ppm due to the homopolymer triad MMM. Among them, the main peak is due to the alternating triad SMS. According to the analysis, the polymers synthesized in the presence of $Et_2AlCl$ have predominantly an alternating structure. In the presence of Lewis acid, system C allows synthesis of alternating copolymers PMMA-alt-S nearly as efficiently as the conventional radical polymerization process (System B).

In this embodiment comprising copolymerization under conditions of a controlled RAFT polymerization process in the presence of a Lewis acid (System C) produces a well-defined alternating copolymer, such as PMMA-alt-S, whereas RAFT copolymerization alone (System A) only allows control of the chain length and polydispersity and a standard radical copolymerization in the presence of Lewis acids (system B) permits only sequence control.

A study of the ratio of Lewis acid to acceptor monomer indicates that as the ratio of the Lewis acid/monomer (LA/M) decreases better control over the polymerization is realized. One embodiment comprises a LA/M ratio of 0.4. wherein the degree of alternation, and also the control of the polymerization were good. Whereas copolymers produced under conditions of controlled polymerization and a ratio of LA/M=0.5. have a degree of alternation similar to polymers produced with a ratio LA/M=0.4, but the level of control over the polymerization was not as good as evidenced by the fast polymerization rate (polymerization is faster and the PDI was broader, 1.57 vs. 1.38 at 60% conversion).

Additional embodiments comprise performing the polymerization in a solvent such as toluene, which may reduce the rate of polymerization as would conducting the copolymerization at a lower temperature.

Different Lewis acids act differently in the various CRP systems e.g. ethyldichloroaluminum works well in providing for alternating copolymers of methacrylates in ATRP. This embodiment allows for the preparation of alternating copolymers in a catalytic controlled polymerization process providing polymers with controlled monomer sequence distribution, molecular weight and PDI. The process of the present invention provides copolymerization in the presence of a complex comprising a monomer. The process may prepare an alternating copolymer with controlled molecular weight and PDI. Any compound that complexes with the monomer may be used. One skilled in the art would understand that the process of the present invention would find broad applicability and other complexes and monomers may be utilized. For example, polymerization in the presence of a complex comprising Lewis acid and a monomer should effect the sequence distribution of the nitroxide polymerization of acrylates, ATRP with Fe catalysts and ATRP with Cu catalysts complexed with acidic ligands, and for degenerative transfer polymerization with $I_2$.

In another embodiment, a complex comprising the monomer may be formed at any point in the polymerization process. For example, a Lewis Acid may be added during a controlled copolymerization process to change the monomer sequence distribution from a random distribution to an alternating distribution. This embodiment may be used to form a block copolymer from the same comonomers wherein each block has differing distributions or sequence of comonomers. Another embodiment is exemplified by copolymerization of an excess of one monomer, such as styrene in the presence of a complex comprising of methyl methacrylate in a batch copolymerization. A styrene/methyl methacrylate alternating copolymer will initially be formed, however, after the methyl methacrylate is consumed in the preparation of an alternating copolymer segment, a homopolymer segment of polystyrene will be formed.

Example 2

Alternating copolymers of differing compositions were prepared using the process of the present invention comprising a complex of diethylaluminum chloride [$AlEt_2Cl$] or ethyl aluminum sesquichloride [EASC] in the following controlled polymerization process:

Butyl methacrylate ("BMA")/S/$AlEt_2Cl$ and BMA/S/EASC;

MMA/S/$AlEt_2Cl$ and MMA/S/EASC;

S/MMA/$AlEt_2Cl$, and MA/S/$AlEt_2Cl$ to prepare polymers of different molecular weights and from different initial concentrations of monomers forming in-situ block copolymers and using sequential polymerization to form "pure" block copolymers.

Chain extension reactions were conducted from homoPS with MMA/S/, from MMA/S/EASC with St, and from BMA/S/$AlEt_2Cl$ with St all using RAFT.

These RAFT polymerization processes in the presence of a Lewis acid monomer complex permitted preparation of copolymers with controlled molecular weight (up to 50000 $g.mol^{-1}$), controlled polydispersity (around 1.3) and controlled composition of the copolymer (up to 90% of alternating triads).

An in situ block copolymer was prepared when an excess of styrene was added to MMA/S/$AlEt_2Cl$. A change in rate was noted as the system transitioned from preparation of an alternating copolymer to preparation of the homopolystyrene block, the rate of polymerization decreased significantly. In this second stage the Lewis acid does not participate in the RAFT mechanism and the rate of polymerization is comparable to the RAFT polymerization of styrene in the absence of an added Lewis acid.

Example 3

Other Lewis acids were also examined for the alternating copolymerization of styrene and methyl methacrylate under conditions of a controlled a RAFT polymerization. Listed in order of increasing Lewis acid acidity, the Lewis acids agents examined were tin tetrachloride, zinc chloride, ethylaluminum sesquichloride and diethylaluminum chloride. Only the aluminum based systems worked well with comyl dithiobenzoate as RAFT agent, with the ethylaluminum sesquichloride system providing best control and fastest copolymerization rate. Other control agents would be expected to act differently with different Lewis acids. A quick indicator for determining the suitability of a Lewis acid as a complexing agent for a particular controlled polymerization is whether the reaction medium remains homogeneous. When there is strong evidence of a heterogeneous system forming on addition of the Lewis acid, the reaction is usually not well controlled.

Example 4

Under Conditions of a Controlled Degenerative Transfer Polymerization Process

Degenerative transfer agents were used to provide conditions for controlled radical polymerizations, including:

MMA-S-$AlEt_2Cl$ with iodoacetonitrile and AIBN: yielding an alternating copolymer with PDI of 1.5

MMA-S-AlEt$_2$Cl with iodoform and AIBN: yielding an alternating copolymer with PDI of 1.4

BMA-S-AlEt$_2$Cl with iodoacetonitrile and AIBN: yielding an alternating copolymer with PDI of 1.68

While other standard free radical initiators were examined and are suitable, AIBN performed well as a radical initiator for the preparation of alternating copolymers using Lewis acid complexed acceptor monomers. Good polymerization control over monomer distribution was obtained with a narrow PDI.

Example 5

Under Conditions of a Controlled NMP Process

An embodiment of present invention comprises the polymerization of monomers under conditions of a NMP process in the presence of a complex comprising at least one of the monomers. The complex in this embodiment comprises methyl acrylate as an exemplary acceptor monomer. At room temperature, the polymerization process of this embodiment was explosively fast. Therefore, MA/S/AlEt$_2$Cl under conditions of a controlled NMP process with TEMPO and SG1 as polymerization mediators was conducted at −30° C. At this lower temperature, the reaction behaved as a conventional radical copolymerization with no control over MW or MWD.

Example 6

Under Conditions of a Controlled ATRP Process

An ATRP copolymerization of styrene and methyl methacrylate was conducted at 40° C. with diethylaluminum chloride as complexing agent using halide anions as ligands in an iron-mediated ATRP and this provided a poorly controlled system, since the PDI was=2.1. So the reaction was run at room temperature. It was stopped after 90 minutes. The reaction was initially brown-black in color but at the end of the reaction, it was yellow-brown. The last sample was taken for the GPC analysis and Mn=9000 g/mol, polydispersity was 1.32.

The lesser degree of control obtained in these initial examples of an ATRP with a Lewis acid can be attributed to a reaction between the basic ligands and the complexing agents. Recently acidic ligands have been shown to work for ATRP, and these should work well to provide controlled ATRP polymerization conditions in the presence of the Lewis acid complex.

Since the addition of a Lewis acid to a controlled polymerization significantly increases the rate of polymerization in all systems presently studied ATRP with stable ligands would provide additional tools for control over the polymerization. In ATRP the rate of polymerization is normally dependent on the concentration of the catalyst and the activity of the catalyst. In reverse ATRP, where the more oxidatively stable higher oxidation state transition metal is added to the reaction and reduced in situ to the lower oxidation state activating the transition metal complex by transfer of a radically transferable atom or group to a radical formed by decomposition of a standard free radical initiator, we have been restricted to high levels of transition metal complex in the reaction. As a result of this requirement for a stoichiometric equivalent of catalyst and radical initiator high activity catalysts or highly active systems, cannot be fully controlled in the reverse ATRP process. However in a coexisting application we disclose a novel method of concurrent reverse and normal initiation processes that allow addition of a low concentration of oxidatively stable transition metal complex to the reaction and formation of a truly catalytic active ATRP transition metal complex in the presence of a standard ATRP initiator. This system can be used for polymerization of highly active monomers, such as the complexed monomers discussed herein, since the concentration of transition metal can be reduced to control the rate of polymerization.

With present commercially available reagents the degenerative transfer systems, RAFT and iodine transfer polymerization (ITP), provides safe slow controlled copolymerization of a donor monomer with a complexed acceptor monomer providing alternating copolymers with controlled MW and narrow MWD, although it is likely that ATRP systems with acidic ligands will also provide a useful route to these materials and that dual initiating procedures will allow low levels of active catalysts in the system.

In another embodiment of the present invention, the complex comprises a transition metal. In certain embodiments, the complex may comprise a transition metal catalyst capable of controlling an ATRP process and an unsaturated monomer. Such a complex alters the reactivity of the monomer when compared to the uncomplexed monomer in non-ATRP copolymerization reactions, including controlled polymerization reactions such as RAFT and NMP in addition to uncontrolled free radical polymerizations.

Example 7

Synthesis, Characterization and Substitution Reactions in Copper(I) Complexes with Coordinated Olefins This particular example of reactivity ratio modification involves the study of the role of monomer coordination to the transition metal complexes normally used in polymerization of unsaturated monomers. In this embodiment, the exemplary complex comprises copper and a monomer. While this example concentrates on complexes comprising Cu$^I$ with PMDETA ligand, other transition metals and other ligands may form similar complexes. Polymerization activity of such complexes in ATRP with and without the presence of RX is also considered in addition to examination of the reactivity of the complexed monomer in other polymerization systems.

7.1. General Procedure for Preparation of a Cu-Monomer Complex and (Co)Polymerization:

All reagents were obtained from commercial sources and used as received. All manipulations were performed in the dry box or using standard Schlenk techniques, unless otherwise noted. The spectroscopic measurements were performed on a UV/VIS/NIR spectrometer (Lambda 900, Perkin Elmer), using either a quartz UV cell joined to a Schlenk flask, or a well-sealed test tube with a UV probe inserted (used when temperature adjustment was necessary). The UV probe was connected to the spectrometer via an optical fiber. The temperature adjustment was accomplished by using either a thermostated oil bath or a H$_2$O/ice mixture. NMR studies were performed using Bruker's 300 and 600 MHz (variable temperature) spectrometers. IR spectra were obtained using FTIR-NIR Spectrometer (Mattson ATI Affinity 60AR).

7.2. Synthesis of [Cu$^I$(PMDETA)(π-CH$_2$CH(COOCH$_3$))][BPh$_4$]

Methanol, acetone, N,N,N',N'',N''-pentamethyldiethylenetriamine (PMDETA) and methyl acrylate (MA) were degassed by bubbling nitrogen for 30 minutes. Cu$^I$Br was purified by stirring in glacial acetic acid, washed with methanol followed by diethyl ether, and dried under vacuum. It was stored in the dry box. NaBPh$_4$ and CuI were used as received. All manipulations were performed in the dry box or using standard Schlenk techniques.

Cu$^I$Br (0.0800 g, 5.58×10$^{-4}$ mol)(or Cu$^I$I(0.1063 g, 5.58×10$^{-4}$ mol)) was added to a methanol (10.0 mL)/Acetone (2.0 mL) solution containing N,N,N',N'',N''-pentamethyldiethylenetriamine (PMDETA) (0.0968 g, 5.58×10$^{-4}$ mol). The addition of Cu$^I$Br (or Cu$^I$I) resulted in formation of a lightly blue homogeneous solution. On addition of methyl acrylate (0.0481 g, 5.58×10$^{-4}$ mol), the reaction mixture changed color to light yellow. The addition of NaBPh$_4$ (0.1910 g, 5.58×10$^{-4}$ mol) resulted in the formation of a yellow precipitate. On warming up to 50° C., the precipitate dissolved. The solution was then cooled in an ice/H$_2$O bath, and after 45 min, yellow needles were obtained. The crystals were then filtered, washed with 15.0 mL of cold methanol and dried under vacuum for 12 hours to yield 0.272 g (76.1%) of [Cu$^I$(PMDETA)(π-CH$_2$CH(COOCH$_3$))]$^+$[BPh$_4$]$^-$. $^1$H NMR (300 MHz, (CD$_3$)$_2$CO, RT): δ 7.35 (m, 8 m-H, BPh$_4^-$), δ 6.93 (t, J=7.3 Hz, 8 o-H, BPh$_4^-$), δ 6.78 (t, J=7.0 Hz, 4 p-H, BPh$_4^-$), δ 5.44 (dd, J$_{trans}$=15 Hz, J$_{cis}$=9.2 Hz, 1 H, =CH—), δ 5.12 (d, J$_{trans}$=15 Hz, 1 H, —CH$_{trans}$H$_{cis}$=CH—), δ 4.79 (d, J$_{cis}$=9.8 Hz, 1 H, —CH$_{trans}$H$_{cis}$=CH—), d 3.76 (s, 3 H, —COOCH$_3$), d 2.85 (m, 4 H, —CH$_2$, PMDETA), d 2.76 (m, 4 H, —CH$_2$, PMDETA), d 2.67 (s, 3 H, —N(CH$_3$)—, PMDETA), d 2.58 (s, 15 H, —N(CH$_3$)$_2$, PMDETA). FT IR (nujol): ν(C=O)=1712 cm$^{-1}$, ν(C=C arom., BPh$_4^-$)=1579 cm$^{-1}$, ν(C=C)=1524 cm$^{-1}$. UV (MeOH): 345 nm (ε=3200 Lmol$^{-1}$ cm$^{-1}$). See FIG. 8.

When the FT IR spectra of neat methyl acrylate and the [Cu$^I$(PMDETA)(CH$_2$CH(COOCH$_3$))]$^+$[BPh$_4$]$^-$ complex are compared (nujol) it is seen that both, C=O and C=C stretching frequencies in the [Cu$^I$(PMDETA)(CH$_2$CH(COOCH$_3$))]$^+$[BPh$_4$]$^-$ complex decrease as a result of methyl acrylate coordination to the copper(I) complex.

An examination of the NMR spectra show that the vinyl protons of the coordinated methyl acrylate are strongly shielded upon coordination. Addition of free methyl acrylate causes upward shift indicating that there is a rapid exchange between coordinated and free methyl acrylate. Whereas coordination of PMDETA to the copper(I) center causes deshielding of the PMDETA protons since PMDETA acts as a base. The upward shift of PMDETA in Cu$^I$Br/PMDETA is not as high as in [Cu$^I$(PMDETA)(CH$_2$CH(COOCH$_3$))]$^+$[BPh$_4$]. This could be due to the presence of free PMDETA ligand, or just the effect of the counterion. The presence of 1 eq. of methyl acrylate to Cu$^I$Br/PMDETA causes a further shift in PMDETA complex. Therefore, the amount of free PMDETA decreased.

7.3. Synthesis of [Cu$^I$(PMDETA)(π-CH$_2$CH(C$_6$H$_5$))][BPh$_4$]

[Cu$^I$(PMDETA)(π-CH$_2$CH(C$_6$H$_5$))][BPh$_4$] was synthesized using procedure similar to that of methyl acrylate complex described above in section 7.2. In a typical experiment, Cu$^I$Br (0.0800 g, 5.58×10$^{-4}$ mol) was added to a MeOH (8.0 mL)/Acetone (1.0 mL) solution containing N,N,N',N'',N''-pentamethyldiethylenetriamine (PMDETA) (0.0968 g, 5.58×10$^{-4}$ mol). Addition of Cu$^I$Br resulted in a formation of light blue homogeneous solution. The addition of NaBPh$_4$ (0.1910 g, 5.58×10$^{-4}$ mol) resulted in the formation of white precipitate. On warming up to 50° C., the precipitate dissolved. The solution was then cooled in an ice/H$_2$O bath, and after 60 min, white needles were obtained. The crystals were then filtered, washed with 30.0 mL of cold methanol and dried under vacuum for 12 hours to yield 0.253 g (68.7%) of [Cu$^I$(PMDETA)(π-CH$_2$CH(C$_6$H$_5$))]$^+$ [BPh$_4$]$^-$. $^1$H NMR (300 MHz, (CD$_3$)$_2$CO, RT): δ 7.55 (m, 2 H, CH$_2$=CHPh), δ 7.35 (m, 11 H, CH$_2$=CHPh and m-H, BPh$_4^-$), δ 6.93 (t, J=7.3 Hz, 8 o-H, BPh$_4^-$), δ 6.78 (t, J=7.0 Hz, 4 p-H, BPh$_4^-$), δ 6.38 (dd, J$_{trans}$=16 Hz, J$_{cis}$=9.8 Hz, 1 H, CH$_2$=CHPh), δ 5.18 (d, J$_{trans}$=16 Hz, 1 H, CH$_{trans}$H$_{cis}$=CHPh), δ 4.69 (d, J$_{cis}$=9.8 Hz, 1 H, CH$_{trans}$H$_{cis}$=CHPh), d 2.76 (m, 4 H, —CH$_2$, PMDETA), d 2.69 (m, 4 H, —CH$_2$, PMDETA), d 2.50 (s, 12 H, —N(CH$_3$)$_2$, PMDETA), d 2.46 (s, 3 H, —N(CH$_3$)—, PMDETA). FT IR (nujol): ν(C=C arom., BPh$_4^-$)=1579 cm$^{-1}$, ν(C=C, CH$_2$=CHPh)=1550 cm$^{-1}$.

X-Ray Structure Analysis

The crystal structure data and experimental details are given in Tables 5 and 6.

TABLE 5

Crystal data and structure refinement for [Cu$^1$(PMDETA)(π-CH$_2$CH(COOCH$_3$))][BPh$_4$].

| | |
|---|---|
| Empirical formula | [C$_{74}$H$_{96}$B$_2$Cu$_2$N$_6$O$_4$] |
| Formula weight | 1282.27 |
| Crystal system | Monoclinic |
| Space group | P2(1)/c |
| Unit cell dimensions | |
| a[Å] | 22.593(2) |
| b[Å] | 9.9506(11) |
| c[Å] | 31.989(4) |
| α[°] | 90 |
| β[°] | 100.047(3) |
| γ[°] | 90 |
| Volume [Å$^3$] | 7081.1(13) |
| Z | 4 |
| T/K | 294(2) |
| Calculated density [g cm$^{-3}$] | 1.203 |
| Absorption coefficient [mm$^{-1}$] | 0.651 |
| F(000) | 2728 |
| Crystal size [mm] | 0.80 × 0.70 × 0.06 |
| Θ range for data collection [°] | 1.71–24.72 |
| Limiting indices | −21 ≦ h ≦ 26 |
| | −11 ≦ k ≦ 11 |
| | −37 ≦ l ≦ 28 |
| Total reflections | 36231 |
| Independent reflections | 12048 |
| | [R(int) = 0.0484] |
| Goodness-of-fit on F$^2$ | 1.012 |
| R | 0.0903 |
| R$_w$ | 0.1565 |
| Largest diff. Peak and hole [A$^{-3}$] | 0.725 and −0.537 |

TABLE 6

Crystal data and structure refinement for [Cu$^1$(PMDETA)π-CH$_2$CH(C$_6$H$_5$))][BPh$_4$].

| | |
|---|---|
| Empirical formula | [C$_{41}$H$_{51}$BCuN$_3$] |
| Formula weight | 660.20 |
| Crystal system | Orthorhombic |
| Space group | Pbca |
| Unit cell dimensions | |
| a[Å] | 17.479(3) |
| b[Å] | 18.046(3) |
| c[Å] | 22.761(4) |
| α[°] | 90 |
| β[°] | 90 |
| γ[°] | 90 |

TABLE 6-continued

Crystal data and structure refinement for
[Cu$^1$(PMDETA)π-CH$_2$CH(C$_6$H$_5$))][BPh$_4$].

| | |
|---|---|
| Volume [Å$^3$] | 7180(2) |
| Z | 8 |
| T/K | 153(2) |
| Calculated density [g cm$^{-3}$] | 1.222 |
| Absorption coefficient [mm$^{-1}$] | 0.641 |
| F(000) | 2816 |
| Crystal size [mm] | 0.36 × 0.28 × 0.10 |
| Θ range for data collection [°] | 1.79–28.28 |
| Limiting indices | −23 ≤ h ≤ 23 |

TABLE 6-continued

Crystal data and structure refinement for
[Cu$^1$(PMDETA)π-CH$_2$CH(C$_6$H$_5$))][BPh$_4$].

| | |
|---|---|
| | −14 ≤ k ≤ 24 |
| | −30 ≤ l ≤ 30 |
| Total reflections | 48069 |
| Independent reflections | 8898 |
| | [R(int = 0.0447] |
| Goodness-of-fit on F$^2$ | 1.023 |
| R | 0.0653 |
| R$_w$ | 0.1097 |
| Largest diff. Peak and hole [A$^{-3}$] | 1.246 and −0.428 |

The X-ray data were collected at room temperature for [Cu$^I$(PMDETA)(π-CH$_2$CH(COOCH$_3$))][BPh$_4$] and at 153 K for [Cu$^I$(PMDETA)(π-CH$_2$CH(C$_6$H$_5$))][BPh$_4$] on a Siemens SMART CCD area detector diffractometer using graphite monochromated Mo-K$_\alpha$ radiation (λ=0.71073 Å), a nominal crystal-to detector distance of 4.40 cm and 0.3° w scans frames. Corrections for Lorentz polarization effects and an empirical absorption correction with the program SADABS were applied. The structures were solved by the Patterson method (SHELXS86) and refined by the full-matrix least-squares method based on F$^2$ (SHELXL93). All non-hydrogen atoms were refined anisotropically and the hydrogens were included in idealized positions.

7.4 Description of the Molecular Structures of [Cu$^I$(PMDETA)(π-CH$_2$CHR)][BPh$_4$] (R=COOCH$_3$ and C$_6$H$_5$)

The crystals of [Cu$^I$(PMDETA)(π-CH$_2$CH(COOCH$_3$))][BPh$_4$] (FIG. 9) are build up of two crystallographically independent cations, [Cu$^I$(PMDETA)(π-CH$_2$CH(COOCH$_3$))]+, and [BPh$_4$]$^-$ anions. No interactions are observed between the counterions. FIG. 10 shows the ORTEP plot of the [Cu$^I$(PMDETA)(π-CH$_2$CH(COOCH$_3$))]$^+$ cation, with the atomic numbering scheme. Selected bond lengths and angles are given in Table 7. PMDETA acts as a tridentate ligand, while the pseudotetrahedral coordination geometry around Cu$^I$ is completed by a π-interaction with the double bond of methyl acrylate. The deviation from tetrahedral geometry is given by the N—Cu—N bond angles, which range from 85.58(12)° to 113.65(12)°. The Cu—N (2.043(3), 2.110(3) and 2.220(3)Å) bond lengths are similar to other Cu$^I$ complexes with tridentate nitrogen based ligands.

TABLE 7

Selected bond distances (Å) and angles (deg) for
[Cu$^1$(PMDETA)(π-CH$_2$CH(COOCH$_3$))][BPh$_4$].

Distances

| | | | |
|---|---|---|---|
| Cu(1)—N(2) | 2.220(3) | Cu(1)—N(5) | 2.043(3) |
| Cu(1)—N(8) | 2.110(3) | Cu(1)—C(14) | 2.021(4) |
| Cu(1)—C(15) | 2.067(4) | C(14)—C(15) | 1.360(6) |

Angles

| | | | |
|---|---|---|---|
| N(2)—Cu(1)—N(5) | 85.58(12) | N(2)—Cu(1)—N(8) | 113.65(12) |
| N(5)—Cu(1)—N(8) | 87.35(13) | N(8)—Cu(1)—C(14) | 108.26(16) |
| N(8)—Cu(1)—C(15) | 129.55(14) | N(2)—Cu(1)—C(14) | 103.52(15) |
| N(2)—Cu(1)—C(15) | 111.64(13) | N(5)—Cu(1)—C(14) | 156.15(17) |
| N(5)—Cu(1)—C(15) | 117.33(15) | C(14)—Cu(1)—C(15) | 38.84(16) |
| Cu(1)—C(14)—C(15) | 72.4(2) | Cu(1)—C(15)—C(14) | 68.8(2) |
| C(14)—C(15)—C(16) | 119.94(4) | | |

The Cu—C distances for coordinated methyl acrylate are non-symmetrical, the Cu$^I$ being closer to the β-carbon (C(14)=2.021(4) Å) than to the α-carbon (C(15)=2.067(4) Å). The difference between the two Cu-C distances is consistent with the chemical shifts in the $^1$H NMR spectrum of the complex as described below. The C=C distance of the coordinated methyl acrylate was determined to be 1.360(6) Å, which is slightly longer than 1.355 Å estimated for free methyl acrylate.

Similarly to the methyl acrylate complex, the asymmetrical unit of the [Cu$^I$(PMDETA)(π-CH$_2$CH(C$_6$H$_5$))][BPh$_4$] crystal (FIG. 11) contains two crystallographically independent cations of the type [Cu$^I$(PMDETA)(π-CH$_2$CH(C$_6$H$_5$))]$^+$, and [BPh$_4$]$^-$ anions. Cations and anions are separated by the usual van der Waals distances. Shown in FIG. 12 is the ORTEP plot of [Cu$^I$(PMDETA)(π-CH$_2$CH(C$_6$H$_5$))][BPh$_4$] cation, with the atomic numbering scheme. Selected bond distances and angles are given in Table 8.

PMDETA acts as a tridentate ligand, while the pseudotetrahedral coordination geometry around Cu$^I$ is completed by a π-interaction with the double bond of styrene. The deviation from tetrahedral geometry is given by the N—Cu—N angles which range from 84.07(6)° to 114.93(6)°. The bond length of one of the terminal nitrogen atoms N(1) in PMDETA ligand to the Cu$^I$ center is significantly longer (Cu(1)-N(1)=2.2255(16) Å) than the other two nitrogen atoms N(4) and N(7) (Cu(1)-N(4)=2.1275(16) Å, Cu(1)-N(7)=2.1282(17) Å). Similar elongation of the Cu$^I$—N bond length has also been observed in structurally related [Cu$^I$(dien)(π-hex)][BPh$_4$] and [Cu$^I$(dien)(π-norbornene)][BPh$_4$] complexes (dien=diehtylenetriamine), although in both these cases the elongation occurred at the central nitrogen atom.

TABLE 8

Selected bond distances (Å) and angles (deg) for
[Cu$^I$(PMDETA)(π-CH$_2$CH(C$_6$H$_5$))][BPh$_4$].

Distances

| | | | |
|---|---|---|---|
| Cu(1)—N(1) | 2.2265(16) | Cu(1)—N(4) | 2.1275(16) |
| Cu(1)—N(7) | 2.1282(17) | Cu(1)—C(13) | 2.052(2) |
| Cu(1)—C(14) | 2.108(2) | C(13)—C(14) | 1.367(3) |

Angles

| | | | |
|---|---|---|---|
| N(4)—Cu(1)—N(7) | 85.80(6) | N(4)—Cu(1)—N(1) | 84.07(6) |
| N(7)—Cu(1)—N(1) | 114.93(6) | C(13)—Cu(1)—N(1) | 109.86(8) |
| C(13)—Cu(1)—N(4) | 153.29(8) | C(13)—Cu(1)—N(7) | 107.14(8) |
| C(14)—Cu(1)—N(1) | 102.84(8) | C(14)—Cu(1)—N(4) | 117.43(9) |
| C(14)—Cu(1)—N(7) | 137.76(9) | C(13)—Cu(1)—C(14) | 38.65(9) |
| Cu(1)—C(13)—C(14) | 68.46(14) | Cu(1)—C(14)—C(13) | 72.89(14) |
| C(13)—C(14)—C(15) | 127.2(2) | | |

The Cu$^I$—C distances for coordinated styrene are not equal, the Cu$^I$ being closer to the β-carbon (Cu(1)-C(14)=2.108(2) Å) than to the α-carbon (Cu(1)-C(13)=2.052(2) Å). The difference between the two Cu—C(Sty) distances (0.056 Å) is consistent with the chemical shifts of the vinyl protons in the $^1$H NMR spectrum, as discussed below. The C=C bond length of the coordinated styrene (1.367(3) Å) is slightly longer than 1.358 Å estimated for free styrene.

$^1$H NMR Spectra

The $^1$H NMR spectra of [Cu$^I$(PMDETA)(π-CH$_2$CHR)][BPh$_4$] (R=COOCH$_3$ and C$_6$H$_5$) are fully consistent with the X-ray structures discussed above. The proton resonances associated with [BPh$_4$]$^-$ anion, such as in NaBPh$_4$, do not change in either of the two Cu$^I$ complexes, indicating the absence of the interactions between ions. On the other hand, the protons of PMDETA ligand in [Cu$^I$(PMDETA)(π-CH$_2$CHR)][BPh$_4$](R=COOCH$_3$ and C$_6$H$_5$) are shifted downfield by approximately 0.5 ppm as a result of coordination to the Cu$^I$ center. Such a downfield shift of the resonances of nitrogen based ligands is generally observed with coordination to the Cu$^I$ center. In contrast, the vinyl protons in methyl acrylate and styrene are shifted upfield, which is an indication of π-back donation. Both complexes undergo rapid monomer exchange reactions at room temperature, as confirmed by the addition of small amount of free monomers. The proton resonances for fully coordinated monomers were estimated from variable temperature NMR studies. The shielding effect is more pronounced in the case of methyl acrylate, which indicates that the contribution from π-back bonding in [Cu$^I$(PMDETA)(π-CH$_2$CH(COOCH$_3$)][BPh$_4$] is stronger than in [Cu$^I$(PMDETA)(π-CH$_2$CH(C$_6$H$_5$))][BPh$_4$]. This result is expected since the —COOCH$_3$ group in methyl acrylate is more electron withdrawing than the -Ph group in styrene. Consequently, the electron density around the double bond in methyl acrylate is lower, which increases the contribution from π-back bonding.

Apart from electron donating/withdrawing groups in the vinyl monomer, there are other factors that can effect the relative contribution from π-back bonding in transition metal complexes with coordinated olefins. They include:

(a) charge and number of d-electrons in transition metal,
(b) basicity of the complexing ligand, and
(c) coordinating ability of the counterion.

Therefore, increasing the positive charge on the transition metal (or decreasing the number of d-electrons) will result in a decrease of the π-back bonding and consequently an increase in the σ-donation from the coordinated olefin. This has been demonstrated both theoretically and experimentally in the case of Pt(0), Pt(I) and Pt(II) complexes with ethylene. Transition metals, that form complexes with olefins, would be expected to act as does the exemplary transition metal, copper, to modify the reactivity of the complexed monomer in copolymerization reactions. Also, ligand basicity can effect the π-back bonding. As indicated above the vinyl protons of coordinated styrene in the [Cu$^I$(2,2'-bipyridine)(π-CH$_2$CH(C$_6$H$_5$))][ClO$_4$] complex are less shielded than in [Cu$^I$(PMDETA)(π-CH$_2$CH(C$_6$H$_5$))][BPh$_4$]. This result can be explained in terms of the ligand basicity. PMDETA ligand, being more basic than 2,2'bipyridine, increases the electron density around Cu$^I$, which results in stronger shielding and higher contribution from π-back bonding.

Lastly, the counterion can also affect the coordinating ability of the vinyl monomer. This is demonstrated in an examination of a series of Cu$^I$/PMDETA complexes with methyl acrylate and styrene with different counterions (BPh$_4$$^-$, PF$_6$$^-$, ClO$_4$$^-$, Br$^-$, and Cl$^-$). For both methyl acrylate and styrene, the shielding increases in the order Cl$^-$<Br$^-$<ClO$_4$$^-$<PF$_6$$^-$<BPh$_4$$^-$. Assuming that the rates of monomer exchange are the same for all complexes, the differences in the shielding can be explained in terms of the partial saturation of the coordination sphere around Cu$^I$ center by the different counterions. Therefore, Cl$^-$ and Br$^-$ anions clearly coordinate to the [Cu$^I$(PMDETA)]$^+$ cation more strongly than ClO$_4$$^-$, PF$_6$$^-$ or BPh$_4$$^-$ and compete with monomers, such as, methyl acrylate and styrene for the empty coordination site.

The importance of π-back bonding in [Cu$^I$(PMDETA)(π-CH$_2$CH(COOCH$_3$))][BPh$_4$] and (Cu$^I$(PMDETA)(π-CH$_2$CH(C$_6$H$_5$))][BPh$_4$] is further demonstrated in unequal shielding of vinyl protons in coordinated monomers. It can be seen from this examination of the spectra that the shielding effect is the weakest with α-carbon (ΔδH$_B$(MA)=0.70 and ΔδH$_B$(Sty)=0.38). These results are consistent with the solid state X-ray structures of the complexes discussed above.

It was determined that for methyl acrylate and styrene complexes, the α-carbons are 0.046 Å and 0.056 Å, respectively, further away from the Cu$^I$ coordination sphere than are the β-carbons. It is therefore expected that the α-protons will be less shielded than the β-protons, or alternatively the π-back donation will be more pronounced in the case of β-protons because they are closer to the Cu$^I$ center than are the α-protons. This unequal shielding of vinyl protons has been observed previously in [Cu$^I$(2,2'-bipyridine)(π-CH$_2$CH(C$_6$H$_5$))][ClO$_4$] complex.[44]

Variable Temperature NMR for [Cu(PMDETA)(St)][BPh$_4$] and [Cu(PMDETA)(MA)][BPh$_4$]

Variable temperature (600 MHz) NMR of St and MA coordinated to Cu(PMDETA)$^+$chromophore was conducted at 10 different temperatures ranging from –7 to 50° C. The results indicated fast exchange even at –7° C. In order to get the signals for true coordinated MA and Sty one would need to measure NMR at even lower temperatures, presumably as low as –50° C.

FT-IR Spectra

FT-IR Spectra also confirm the π back bonding nature of the bonds in the complex. There is a decrease in the stretching of the C=C bonds indicating a weakening of the bonds 7.5. Synthesis of [Cu$^I$(PMDETA)(4VP)][BPh$_4$]

Isolation of the complex with 4-vinyl pyridine was successful, although the yield of the reaction was very low (17%). Crystals were studied by X-ray diffraction.

7.6. Synthesis of [Cu$^I$(PMDETA)(1-HEX)][BPh$_4$]

Isolation of the complex with 1-hexene was successful, yield of the reaction 86%. Crystals were studied by X-ray diffraction.

A detailed discussion of the formation of the transition metal-monomer complex has been provided to show the similarity between the complex formed between the monomers and transition metals employed for ATRP and the complexes formed between olefins and the transition metals employed as catalysts for olefin polymerization. One embodiment of the present invention includes complexes formed between a monomer and a transition metal modify the reactivity of the complexed monomer in all types of polymerization processes including radical polymerization and controlled polymerizations. This is exemplified below.

Example 8

Copolymerization of Styrene and Methyl Methacrylate in the Presence of AIBN and [Cu$^I$(PMDETA)(π-Sty)][BPh$_4$] Complex at 60° C.

The molar ratio's of the reagents are given in the following table and the reaction was conducted using the normal Schlenk techniques described in other publications by one or more of the present inventors. The reaction was initially heterogeneous due to partial precipitation of the Cu(I) complex from solution, As shown in the table below the composition of the copolymer was significantly different than expected for a radical copolymerization of these two monomers; the complexed monomer, styrene, is essentially homopolymerizing; i.e. homo-propagation is preferred over cross propagation.

| Time/min | Overall Conv. | Mol % Sty | M$_n$ | M$_w$ | PDI |
|---|---|---|---|---|---|
| 5 | 2.0 | 99.8 | 1.01 × 10$^4$ | 1.92 × 10$^4$ | 1.90 |
| 12 | 4.0 | 99.8 | 1.00 × 10$^4$ | 1.99 × 10$^4$ | 1.98 |
| 20 | 8.0 | 99.5 | 9.73 × 10$^3$ | 1.87 × 10$^4$ | 1.92 |
| 62 | 12.0 | 97.6 | 8.41 × 10$^3$ | 2.34 × 10$^4$ | 2.78 |

$^{8a}$[Sty]$_0$ = 4.5 M; [MMA]$_0$ = 4.5 M; [Cu$^1$Br]$_0$ = [PMDETA]$_0$ = [NaBPh$_4$]$_0$ = [AIBN]$_0$ = 4.5 × 10$^{-2}$ M.

The percent of incorporated styrene is much higher than expected for conventional free radical copolymerization, (45%styrene/55% MMA). This experiment was repeated three times and the results are reproducible. However, the polymerization rate for homopolymerization of styrene in the presence of the Cu$^I$ complex was found to be identical to free AIBN initiated homopolymerization. I.e. only crosspropagation kinetics are affected by monomer complexation.

Example 9

Copolymerization of 1-Hexene and Methyl Methacrylate in Toluene in the Presence of AIBN and [Cu$^I$(PMDETA)(π-1-hex)][BPh$_4$] Complex at 60° C.

The reaction mixture was initially heterogeneous but after 12 minutes heating at 60° C. the reaction became homogeneous and a yellow/orange color. The results of the polymerization are presented below.

| Time/min | Overall Conv. | Mol % 1-hex | M$_n$ | M$_w$ | PDI |
|---|---|---|---|---|---|
| 11 | 0.5 | 24 | 4.12 × 10$^4$ | 6.05 × 10$^4$ | 1.47 |
| 22 | 2.0 | 14 | 4.06 × 10$^4$ | 5.98 × 10$^4$ | 1.47 |
| 36 | 4.0 | 14 | 3.89 × 10$^4$ | 6.43 × 10$^4$ | 1.65 |
| 60 | 7.5 | 13 | 3.66 × 10$^4$ | 6.13 × 10$^4$ | 1.996 |

[1-hex]$_0$ = 2.9 M; [MMA]$_0$ = 2.9 M; [Cu$^1$Br]$_0$ = [PMDETA]$_0$ = [NaBPh$_4$]$_0$ = [AIBN]$_0$ = 2.9 × 10$^{-2}$ M.

Again one can see that the concentration of the complexed monomer-hexene in the formed copolymer is much higher when hexene is complexed with a copper than is seen for standard radical copolymerization of these two monomers.

The invention claimed is:

1. A polymerization process, comprising:
    polymerizing first monomers and second monomers under conditions of a controlled polymerization process, wherein the polymerizing is conducted in the presence of a complex comprising at least one of the monomers and a Lewis acid, to increase the tendency to form an alternating copolymer.

2. The polymerization process of claim 1, further comprising:
    forming a copolymer wherein the sequence distribution of the monomers in the copolymer is different than the sequence distribution of a copolymer formed in the absence of the complex.

3. The polymerization process of claim 1, wherein the reactivity of the complexed monomer is different than the reactivity of the same monomer in an uncomplexed state.

4. The polymerization process of claim 3, wherein the first monomer is a vinyl monomer or an alkyl-olefin and the reactivity of the complexed monomer relative to the second monomer is greater than the reactivity of the free alkyl-olefin relative to the second monomer.

5. The polymerization process of claim 1, wherein the cross propagation kinetics of the complexed monomer differ from the cross propagation kinetics of the free monomer.

6. The polymerization process of claim 1, wherein the complex comprises an alkylaluminum chloride.

7. The polymerization process of claim 1, wherein the complex comprises one of diethylaluminum chloride arid ethyl aluminum sesquichloride.

8. The polymerization process of claim 7, wherein the reactivity of the complexed monomer is different than the reactivity of a free monomer.

9. The polymerization process of claim 1, wherein the controlled polymerization process is a controlled radical polymerization process.

10. The polymerization process of claim 8, wherein the complex comprises the first monomer and the first monomer is an alkyl olefin.

11. The polymerization process of claim 10, wherein the reactivity of the alkyl olefin is enhanced by the being complexed.

12. The polymerization process of claim 1, wherein the controlled polymerization process is one of a degenerative transfer process, a RAFT process, an atom transfer radical polymerization process, and nitroxide mediated process.

13. The polymerization process of claim 1, further comprising:
forming an alternating copolymer.

14. The polymerization process of claim 13, wherein the monomers are methyl methacrylate and styrene and the copolymer has a polydispersity of less than 2.

15. The polymerization process of claim 13, where in the copolymer has a polydispersity of less than 1.5.

16. The polymerization process of claim 13, wherein the monomers are butyl methacrylate and styrene and the copolymer has a polydispersity of less than 2.

17. The polymerization process of claim 16, where in the copolymer has a polydispersity of less than 1.5.

18. The polymerization process of claim 13, wherein the monomers are methyl acrylate and styrene and the copolymer has a polydispersity of less than 2.0.

19. The polymerization process of claim 18, where in the copolymer has a polydispersity of less than 1.5.

* * * * *